United States Patent
Sawayama et al.

(10) Patent No.: US 7,656,477 B2
(45) Date of Patent: Feb. 2, 2010

(54) REFLECTIVE DISPLAY DEVICE AND METHOD FOR FABRICATING THE SAME

(75) Inventors: Yutaka Sawayama, Nabari (JP); Makoto Kanbe, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 181 days.

(21) Appl. No.: 11/488,128

(22) Filed: Jul. 18, 2006

(65) Prior Publication Data
US 2007/0024777 A1 Feb. 1, 2007

(30) Foreign Application Priority Data
Jul. 26, 2005 (JP) ............................. 2005-216454

(51) Int. Cl.
G02F 1/1335 (2006.01)
G02F 1/141 (2006.01)

(52) U.S. Cl. .................. 349/113; 349/114; 349/136

(58) Field of Classification Search .................. 349/113, 349/114, 136
See application file for complete search history.

(56) References Cited

U.S. PATENT DOCUMENTS

| 6,376,271 | B1 | 4/2002 | Sawayama et al. |
| 6,788,366 | B2 | 9/2004 | Sawayama et al. |
| 2003/0053015 | A1 | 3/2003 | Minoura et al. |
| 2003/0164915 | A1 | 9/2003 | Fujiwara et al. |
| 2005/0088743 | A1 | 4/2005 | Sawayama et al. |

FOREIGN PATENT DOCUMENTS

JP 2006-64925 3/2006

*Primary Examiner*—Frank G Font
*Assistant Examiner*—Mary A El Shammaa
(74) *Attorney, Agent, or Firm*—Nixon & Vanderhye P.C.

(57) ABSTRACT

A reflective display device includes: a light modulating layer; two substrates, between which the light modulating layer is interposed; and an electrode structure that changes the optical properties of the light modulating layer on a pixel-by-pixel basis. One of the two substrates includes a corner cube array in which a plurality of corner cubes are arranged. The corner cube array includes a principal surface that defines a retroreflective surface, a bottom, and a plurality of conductive members that are arranged between the principal surface and the bottom. A portion of the upper surface of each of the conductive members defines a part of the principal surface of the corner cube array. The part is located in a lowest-level portion of its associated corner cube including the lowest-level point thereof.

12 Claims, 17 Drawing Sheets

○ HIGHEST-LEVEL POINT
● LOWEST-LEVEL POINT
△ SADDLE POINT

REFLECTIVE DISPLAY DEVICE AND METHOD FOR FABRICATING THE SAME

BACKGROUND OF THE INVENTION

1. Field of the Invention

The present invention relates to a reflective display device and a method for fabricating such a display device.

2. Description of the Related Art

A reflective liquid crystal display device for conducting a display operation by utilizing ambient light as its light source has been known in the art. Unlike a transmissive liquid crystal display device, the reflective liquid crystal display device needs no backlight, thus saving the power for light source and allowing the user to carry a smaller battery. Also, the space to be left for the backlight in a transmissive device or the weight of the device itself can be saved. For that reason, the reflective liquid crystal display device is not only effectively applicable to various types of mobile electronic units that should be as lightweight and as thin as possible but also allows the use of a battery of an increased size as compared to a unit including the transmissive device. This is because the space to be left for a backlight in the transmissive device can be used for other purposes in the reflective display device. Thus, the reflective liquid crystal display device is expected to increase the longest operating time of those units by leaps and bounds.

Also, an image presented by a reflective liquid crystal display device has a better contrast than an image presented by a display device of any other type even when the display device is used outdoors in the sun. For example, when a CRT, a self-light-emitting display device, is used outdoors in the sun, the contrast ratio of an image presented thereon decreases significantly. Likewise, even a transmissive liquid crystal display device, subjected to low reflection treatment, also presents an image at a significantly decreased contrast ratio when the device is operated in an environment in which the ambient light is much intenser than the display light (e.g., in direct sunshine). On the other hand, a reflective liquid crystal display device increases the intensity of the display light proportionally to the quantity of the ambient light, thus avoiding the significant decrease in contrast ratio even where the ambient light is intense. For that reason, a reflective liquid crystal display device can be used particularly effectively in mobile electronic units that are often used outdoors, e.g., personal digital assistants, digital cameras and camcorders.

Even though the reflective liquid crystal display devices have these advantageous features that are very useful in various applications, the reflective devices currently available are not fully satisfactory yet in terms of their contrast ratio in dark places, definition, and full-color and moving picture presentation capabilities, for example. Thus, the development of more practically useful, reflective color liquid crystal display devices is awaited.

To enhance the display performance of reflective color liquid crystal display devices, a reflective liquid crystal display device using a retroreflector (which will be referred to herein as a "retroreflective liquid crystal display device") was proposed in Japanese Patent Application Laid-Open Publication No. 2003-195788 and Japanese Patent Application Laid-Open Publication No. 2003-255373, which were filed by the applicant of the present application. A "retroreflector" is an element for reflecting an incoming light ray by a plurality of reflective surfaces back toward its source, no matter where the light ray has come from. And the retroreflector has a structure in which very small unit structures are arranged two-dimensionally, e.g., an array of microspheres, an array of microlenses, and an array of corner cubes.

Hereinafter, the operation principle of a retroreflective liquid crystal display device will be described with reference to FIGS. 1A and 1B, which schematically illustrate the black and white display modes of the display device, respectively.

As shown in FIG. 1A, if a liquid crystal layer 1 is controlled to exhibit a transmitting state, an incoming light ray 3, which has been emitted from a light source 5 outside of the display device, is transmitted through the liquid crystal layer 1 and then reflected back by a retroreflector 2 toward its light source 5 as pointed by the arrow 4b. Thus, the light ray 3 that has been emitted from the light source 5 does not reach the eyes of a viewer 6. In such a state, the image reaching the eyes of the viewer 6 from this display device is the image of his or her own eyes. In this manner, the "black" display mode is realized.

On the other hand, if the liquid crystal layer 1 is controlled to exhibit a scattering state, the incoming light ray 3 that has been emitted from the light source 5 is scattered by the liquid crystal layer 1 as shown in FIG. 1B. Specifically, if the liquid crystal layer 1 is a forward scattering liquid crystal layer, the scattered light is reflected by the retroreflector 2 toward the viewer 6 through the liquid crystal layer 1 in the scattering state (as pointed by the arrows 4w). In this case, since the retroreflectivity of the retroreflector 2 is disturbed by the scattering caused by the liquid crystal layer 1, the incoming light ray 3 does not return to its light source, thus realizing a "white" display mode.

By conducting a display operation based on this operation principle, a monochrome display is realized without using any polarizer. Consequently, a high-brightness reflective liquid crystal display device, of which the optical efficiency is not decreased by the use of polarizers, is realized.

FIG. 2 is a cross-sectional view illustrating a configuration for a conventional retroreflective liquid crystal display device that utilizes this operation principle.

The display device 100 includes a front substrate 10, on which a plurality of color filters 19, a transparent counter electrode 18 and a liquid crystal alignment film (not shown) are stacked, a rear substrate 12 arranged so as to face the front substrate 10, and a liquid crystal layer 1 interposed between these substrates 10 and 12. The rear substrate 12 includes an interlevel dielectric layer 20, a reflective layer 2 and an alignment film (not shown), which are stacked in this order on a TFT substrate including a plurality of switching elements such as thin-film transistors (TFTs). The interlevel dielectric layer 20 has a surface shape that achieves retroreflectivity. In this display device 100, the reflective layer 2 has been formed on the interlevel dielectric layer 20 and has unevenness corresponding to the surface shape of the interlevel dielectric layer 20, thus functioning as a retroreflector. Also, the reflective layer 2 is made up of a plurality of pixel electrodes 8, which are arranged separately from each other for respective pixels as units of an image presented. Each of those pixel electrodes 8 in the reflective layer 2 is connected to the drain electrode 15 of its associated switching element 14 by way of a contact portion 16 that has been formed through the interlevel dielectric layer 20. The liquid crystal layer 1 may be a scattering liquid crystal layer that can switch between the light transmitting state and the light (forward) scattering state by changing the voltages applied between the counter electrode 18 and each of those pixel electrodes.

To further increase the contrast ratio on the screen of the conventional retroreflective liquid crystal display device shown in FIG. 2, it is important to maximize the retroreflectivity of the reflective layer 2 and thereby minimize the quantity of unwanted reflected light reaching the viewer's eyes in the black display mode. Thus, a display device including a corner cube array, which is one of retroreflectors realizing the highest retroreflectivities, was proposed in Japanese Patent Application Laid-Open Publication No. 2003-195788, for example. More specifically, the display device uses a corner cube array as the interlevel dielectric layer 20, on which a reflective layer 2 with the corner cube array shape has been deposited. As used herein, the "corner cube array" is a two-dimensional array of corner cubes, each defined by three planes that are opposed substantially perpendicularly to each other. A light ray that has entered a corner cube is ideally reflected back toward its source by the three planes that form the corner cube.

FIGS. 3A and 3B are respectively a plan view and a perspective view illustrating the configuration of a corner cube array. The corner cube array shown in FIGS. 3A and 3B is a cubic corner cube array in which a number of corner cubes, each being defined by three square planes that are opposed perpendicularly to each other, are arranged two-dimensionally. The shortest distance $P_{cc}$ between the tops of two adjacent corner cubes will be referred to herein as an "arrangement pitch of corner cubes".

Also, a method of making a corner cube array in which corner cubes of a very small size are arranged (and which will be referred to herein as a "micro corner cube array (MCCA)") by etching anisotropically the surface of a substrate with a crystal structure was proposed by the applicant of the present application in Japanese Patent Application Laid-Open Publication No. 2003-066211. The arrangement pitch $P_{cc}$ of the MCCA may be equal to or greater than the wavelength of visible radiation and equal to or smaller than the maximum pixel width of a reflective liquid crystal display device, for example.

If an MCCA is used as the interlevel dielectric layer 20 in the display device 100 shown in FIG. 2, then the following problems will arise.

In this display device 100, each pixel electrode 8 is electrically connected to the drain electrode 15 of its associated switching element 14 by way of a contact portion 16 that has been formed through the interlevel dielectric layer 20. The contact portion 16 has been formed in a contact hole that has been cut through the interlevel dielectric layer 20. If a contact hole is cut, however, the surface shape of the interlevel dielectric layer 20 partially collapses, thus decreasing the retroreflectivity of the reflective layer 2 to be deposited on the interlevel dielectric layer 20.

This problem will be described more fully with reference to the accompanying drawings.

FIGS. 4A and 4B are schematic cross-sectional views illustrating an ordinary process for forming the reflective layer 2. First, as shown in FIG. 4A, a contact hole 17 is cut through the interlevel dielectric layer 20 with the MCCA shape so as to reach the upper surface of the drain electrode 15 of a switching element 14. Thereafter, as shown in FIG. 4B, a conductive film is deposited on the inner surface of the contact hole 17 and on the interlevel dielectric layer 20 and then patterned, thereby forming the reflective layer 2 and the contact portion 16 out of the same conductive film. As can be seen from FIG. 4B, the predetermined surface shape is not formed in a portion 22 of the reflective layer 2 that is located over the contact portion 16, and therefore, the retroreflectivity decreases significantly in that portion 22 than the other portions of the reflective layer 2. That portion 22 of the reflective layer 2 will be referred to herein as a "non-retroreflective portion". When there is such a non-retroreflective portion 22, the retroreflectivity of the reflective layer 2 decreases, thus causing a decrease in contrast ratio on the screen.

Also, the present inventors discovered and confirmed via experiments that when the reflective layer 2 was formed by the process shown in FIGS. 4A and 4B, the areas of the non-retroreflective portions 22 of respective pixels were too varied to realize uniform display performance. Hereinafter, this problem will be further discussed with reference to FIGS. 5A through 5D.

FIG. 5A is a cross-sectional view of contact holes 17a, 17b and 17c that have been made around the lowest-level point of a corner cube in the interlevel dielectric layer 20, around the highest-level point of another corner cube, and halfway between the lowest- and highest-level points of still another corner cube. As shown in FIG. 5A, the required depth of a contact hole changes according to the position of the contact hole in the corner cube. As used herein, the "depth of a contact hole" will refer to a distance from the surface of the interlevel dielectric layer 20 to that of a drain electrode exposed by the contact hole.

The respective depths of the contact holes will be described by way of specific examples. If the surface of the interlevel dielectric layer 20 has the shape of a cubic corner cube array with an arrangement pitch of 10 μm, then the height of each corner cube (i.e., the distance from a plane including a plurality of lowest-level points to the highest-level point) will be approximately 80% of the arrangement pitch, i.e., about 8 μm. Also, to protect switching elements (TFTs) with a thickness of 1 μm, the surface of those switching elements is preferably covered with an insulating layer that has a thickness of at least 2 μm. That is why the distance from the bottom of the interlevel dielectric layer 20 to the lowest-level points of the corner cubes may be 2 μm, for example. In such an example, the contact hole 17a made around the lowest-level point of a corner cube has a depth of 2 μm, the contact hole 17b made around the highest-level point of another corner cube has a depth of 10 μm, and the depths of the contact holes are variable within the range of 2 μm to 10 μm.

Generally speaking, to electrically connect two electrodes, which are located over and under the interlevel dielectric layer 20, respectively, with each other through a contact hole 17 of the interlevel dielectric layer 20 just as intended, it is important that the bottom size Sb of the contact hole 17 (i.e., the surface area of the drain electrode exposed through the contact hole 17) is at least equal to a predetermined value and that a cross section of the contact hole 17, as viewed perpendicularly to the surface of the substrate, has a predetermined taper angle (which will be simply referred to herein as a "taper angle") Ta as shown in FIG. 5B. That is why every contact hole 17 of the interlevel dielectric layer 20 is preferably controlled so as to have substantially the same bottom size Sb and almost the same taper angle Ta.

However, if one attempts to equalize the bottom sizes Sb and taper angles Ta of the contact holes 17a, 17b and 17c with each other, then the sizes Su of those contact hole will change with the depths of the contact holes. That is to say, a contact hole 17a with a relatively small size Su is made around the lowest-level point of a corner cube, while a contact hole 17b, of which the size Su is larger than that of the contact hole 17a, is made around the highest-level point of another corner cube as shown in FIG. 5C. As used herein, the "size Su of a contact hole" means the size of a cross section of the contact hole at the uppermost portion thereof as viewed parallel to the surface of the substrate.

If a reflective layer 2 is formed on such an interlevel dielectric layer 20 having contact holes 17 of multiple different sizes Su, then the non-retroreflective regions 22 of the reflective layer 2 will have their areas varied with the sizes Su of the contact holes 17 as shown in FIG. 5D. For example, in a portion of the reflective layer 2 that is located over the contact hole 17a, the retroreflector shape of one corner cube is affected by the non-retroreflective region 22a. On the other hand, in another portion of the reflective layer 2 that is located over the contact hole 17b, the retroreflector shape of two corner cubes is affected by the non-retroreflective region 22b. As a result, uniform retroreflectivity is no longer achieved within the same display area and the brightness will vary on the same screen. Furthermore, the brightness also changes with the color to be presented (i.e., R, G or B), thus causing a coloring phenomenon in a white display mode, too.

On the other hand, Japanese Patent Application Laid-Open Publication No. 2003-195788 discloses an arrangement that is designed to position all of those contact holes 17 around the lowest-level points of corner cubes by matching the arrangement pattern of switching elements (TFTs) 14 on the TFT substrate 16 to that of the corner cubes on the interlevel dielectric layer 20. According to this arrangement, the depths of the contact holes 17 can be substantially equalized with each other in all pixels, thus realizing a uniform display characteristic all over the display area. In addition, since all of the contact holes 17 are positioned around the lowest-level points of the corner cubes, the non-retroreflective regions 22 of the reflective layer 2 can have reduced areas. As a result, the deterioration of the retroreflectivity due to the variation in the area of the non-retroreflective regions 22 can be minimized.

To make a reflective display device such as that disclosed in Japanese Patent Application Laid-Open Publication No. 2003-195788, however, it is difficult to match the arrangement pattern of the corner cubes to that of the switching elements with high precision particularly when a corner cube array with a small arrangement pitch is used. Japanese Patent Application Laid-Open Publication No. 2003-195788 also proposes a method of forming the interlevel dielectric layer 20 using a transfer mold. According to such a method, it is necessary to make a different transfer mold for every type of TFT substrate for use in a display device, thus increasing the manufacturing cost unintentionally.

To overcome such a problem, the applicant of the present application proposed an arrangement, which is specially designed for a reflective display device to minimize the deterioration in the retroreflectivity caused by the non-retroreflective regions, in Japanese Patent Application Laid-Open Publication No. 2003-255373. According to this arrangement, the reflective layer can also maintain its predetermined MCCA shape even over the contact portions, thus reducing the overall area of the non-retroreflective regions formed by the contact portions as will be described in detail later.

FIG. 6 is a schematic cross-sectional view illustrating the arrangement of a reflective display device as proposed in Japanese Patent Application Laid-Open Publication No. 2003-255373. If any of the components of the reflective display device shown in FIG. 6 has the same function as the counterpart of the reflective display device shown in FIG. 2, that pair of components will be identified by the same reference numeral and the description thereof will be omitted herein for the sake of simplicity.

On the rear substrate 12 of the display device 200, stacked in this order are an interlevel dielectric layer 40, of which the surface has an MCCA shape, and a reflective layer 46 having the same surface shape as the interlevel dielectric layer 40. The reflective layer 46 is made up of a plurality of pixel electrodes 48. The interlevel dielectric layer 40 includes contact portions 44 to electrically connect each of those pixel electrodes 48 to its associated switching element 15. The surface of each contact portion 44 forms a part of the MCCA shape of the interlevel dielectric layer 40. That is why the reflective layer 46 can maintain its predetermined retroreflective shape even over the contact portions 44.

Japanese Patent Application Laid-Open Publication No. 2003-255373 also discloses a method of forming such an interlevel dielectric layer 40 and such a reflective layer 46 by a transfer process. Hereinafter, it will be described with reference to FIGS. 7A through 7D how to form the interlevel dielectric layer 40 and the reflective layer 46 according to the method disclosed in Japanese Patent Application Laid-Open Publication No. 2003-255373.

First, as shown in FIG. 7A, a layer to be patterned 30 is formed on a substrate 35 that already has a plurality of switching elements (TFTs)(not shown) thereon. The layer to be patterned 30 includes a resin layer 32 of an insulating resin and a plurality of conductive portions 34, which are arranged in the resin layer 32 so as to make an electrical contact with the drain electrodes of their associated switching elements. The resin layer 32 may be formed by applying a photosensitive acrylic resin, for example. The conductive portions 34 may be formed by cutting openings to reach the surface of the drain electrodes through the resin layer 32 and then filling the openings with a resin material with conductivity and photosensitivity (e.g., a conductive resin such as an acrylic resin), for example.

Thereafter, as shown in FIG. 7B, the uneven surface shape of a master (such as a die) 36 is transferred onto the layer to be patterned 30 by a stamping process, for example. The uneven surface shape of the master 36 may define the cubic corner cube array shown in FIG. 3, for example. The transfer process may be done by putting the master 36 at a predetermined position on the surface of the layer to be patterned 30 and then irradiating the layer to be patterned 30 with an ultraviolet ray with pressure applied on the master 36 toward the substrate 35.

When the master 36 is removed from the substrate 35 after that, an interlevel dielectric layer 40 such as that shown in FIG. 7C can be obtained. The interlevel dielectric layer 40 includes contact portions 44, corresponding to the conductive portions 34 of the layer to be patterned 30, and an insulating layer 42 corresponding to the resin layer 32 of the layer to be patterned 30. The surface of the contact portions 44 and the surface of the insulating layer 42 have the inverted shape of the uneven surface shape of the master 36 (i.e., has an MCCA shape).

Subsequently, as shown in FIG. 7D, a reflective layer 46 of a metal such as Ag is deposited on the surface of the interlevel dielectric layer 40 by a sputtering process or an evaporation process, for example, and then patterned if necessary.

According to this method, the interlevel dielectric layer 40 is formed by deforming not only the resin layer 32 but also the conductive portions 34 on the substrate 35 by a transfer process. Thus, the reflective layer 46 that has been deposited on the interlevel dielectric layer 40 also has the predetermined MCCA shape even over the contact portions 44 and has no regions at all with locally decreased retroreflectivity (such as the non-retroreflective regions 22 shown in FIG. 4B) as shown in FIG. 7D. Consequently, the reflective layer 46 can exhibit uniform and good retroreflectivity all over the display area while minimizing the deterioration or variation in retroreflectivity that would be caused by those non-retroreflective regions.

However, the present inventors discovered that the following problems happened when a reflective display device was fabricated by the method that has just been described with reference to FIGS. 7A through 7D.

According to the method described above, the two types of resins included in the resin layer 32 and conductive portions 34 of the layer to be patterned 30 cure and shrink independently of each other during the transfer process. In this case, if the resin materials of the resin layer 32 and conductive portions 34 had significantly different properties, then the surface shape might collapse, and the desired retroreflectivity could not be realized, in the boundaries between the resin layer 32 and the conductive portions 34 (i.e., in the boundaries between the insulating layer 42 and the contact portions 44). To avoid such a collapse, the range of selectable materials would be limited.

In the transfer process step of the process shown in FIGS. 7A through 7D, pressure (which will be referred to herein as "pressing pressure") is applied on the master 36 and toward the substrate 35 after the master 36 has been put on the layer to be patterned 30 as described above. By applying this pressing pressure, not only the resin layer 32 but also the conductive portions 34 need to be deformed by the transfer process. However, the conductive portions 34 made of a conductor such as a metal have higher rigidity, and are deformed less easily with pressure or heat, than the resin layer 32. That is why to deform both the conductive portions 34 and the resin layer 32 with a pressing pressure at the same time, the pressing pressure needs to be increased compared to the situation where only the resin layer 32 should be deformed. If the pressing pressure is increased in the transfer process step, however, the rear substrate might suffer some damage or any other inconvenience might arise. As used herein, the "pressing pressure" refers to pressure applied per substrate on the transfer mold and toward the substrate.

This problem will be described more fully with reference to the accompanying drawings. FIGS. 8A and 8B are schematic cross-sectional views illustrating the transfer process step shown in FIG. 7B in further detail.

As shown in FIG. 8A, even if high pressing pressure is applied on the master 36 and toward the substrate 35, the yield point is reached earlier in the resin layer 32 of the layer to be patterned 30 than in the conductive portions 34. That is why most of the pressing pressure is used to plastically deform the resin layer 32 and does not reach the substrate 35. Meanwhile, in the conductive portions 34 of the layer to be patterned 30, the pressure on the conductive portion 34 is conveyed to the substrate 35 as pointed by the arrow 39 before the yield point is reached. As a result, some portions of the substrate 35 will be subjected to excessively high pressure locally and may suffer some damage as shown in FIG. 8B. For example, if a TFT substrate, including TFTs on a glass substrate, is used as the substrate 35, then the glass substrate may be partially broken under the pressing pressure applied in the transfer process as identified by the reference numeral 41.

Also, if the pressing pressure is high, then the highest-level points of the uneven surface of the master 36 might contact with TFTs or thin-film lines on the substrate 35. For example, if one of the highest-level points of the master 36 contacted with the channel region of a TFT, then the channel region will be exposed on the interlevel dielectric layer 20 formed by the transfer process and leakage current will flow between the source and drain electrodes of the TFT or any other inconvenience may be caused.

The conductive portions 34 may be made of an electrically insulating resin in which fine conductive particles (such as nanoparticles of a metal) are dispersed. In that case, if the number of those conductive particles is increased to maintain the electrical conductivity of the conductive portions 34, then that resin with conductive particles will have decreased elasticity and increased brittleness. When stamped, a highly brittle material might be broken and produce dust without being deformed with the master. And if such dust (i.e., electrically conductive foreign matter) has scattered in the insulating layer 42 of the interlevel dielectric layer 40, then electrical connection may no longer be maintained between a drain electrode and the reflective layer 46, leakage current may flow between adjacent drain electrodes or any other problem may arise. That is why it is difficult to increase the conductivity of the contact portions 44 without deteriorating the electrical insulating property of the insulating layer 42.

As described above, according to the method that has been described with reference to FIGS. 7A through 7D, not only the resin layer 32 but also the conductive portions 34 should be deformed in the layer to be patterned 30 by the transfer process. As a result, the desired retroreflectivity may not be realized or various problems may arise in the manufacturing process.

In order to overcome the problems described above, a primary object of the present invention is to improve the display performance of a retroreflective display device by increasing the retroreflectivity of its reflective layer.

Another object of the present invention is to provide a highly productive method for fabricating such a reflective display device easily.

SUMMARY OF THE INVENTION

A reflective display device according to the present invention includes: a light modulating layer; two substrates, between which the light modulating layer is interposed; and an electrode structure that changes the optical properties of the light modulating layer on a pixel-by-pixel basis. One of the two substrates includes a corner cube array in which a plurality of corner cubes are arranged. The corner cube array includes a principal surface that defines a retroreflective surface, a bottom and a plurality of conductive members that are arranged between the principal surface and the bottom. A portion of the upper surface of each of the conductive members defines a part of the principal surface of the corner cube array, the part being located in a lowest-level portion of its associated corner cube including the lowest-level point thereof.

In one preferred embodiment of the present invention, the upper surface of each of the conductive members is opposed to multiple lowest-level points of its associated corner cubes.

In another preferred embodiment, the portion of the upper surface of each of the conductive members forms a part of the principal surface of the corner cube array. When measured from a plane including multiple lowest-level points of the corner cube array, the height of the portion of the upper surface of the conductive member is less than a half of the height of the highest-level points of the corner cube array.

In still another preferred embodiment, the one substrate includes a plurality of switching elements on the bottom of the corner cube array, and each of the conductive members is electrically connected to an associated one of the switching elements.

In yet another preferred embodiment, the conductive members may include a conductive resin.

In yet another preferred embodiment, the conductive members may include anisotropic conductive particles.

In yet another preferred embodiment, the conductive members may include a resin layer and a conductive film that covers the resin layer.

In a specific preferred embodiment, each of the corner cubes in the corner cube array may be defined by three substantially square planes that are opposed perpendicularly to each other. Alternatively, each of the corner cubes in the corner cube array may be defined by three substantially rectangular triangular planes that are opposed perpendicularly to each other.

In yet another preferred embodiment, the reflective display device may further include pixel electrodes, of which the shape corresponds with the surface shape of the corner cube array, between the corner cube array and the light modulating layer.

In yet another preferred embodiment, the reflective display device may further include a flattening layer for flattening the surface shape of the corner cube array between the corner cube array and the light modulating layer.

A method for fabricating a reflective display device according to the present invention is designed to fabricate a display device that includes a light modulating layer, two substrates, between which the light modulating layer is interposed, and an electrode structure that changes the optical properties of the light modulating layer on a pixel-by-pixel basis. The method includes the steps of: providing a substrate including a plurality of switching elements thereon; forming a layer to be patterned, including a plurality of conductive members, each being electrically connected to an associated one of the switching elements, and an insulating layer covering the conductive members, over the substrate; making a master with an uneven surface shape; and transferring the uneven surface shape of the master onto the layer to be patterned, thereby exposing the upper surface of the conductive members only partially.

In one preferred embodiment of the present invention, the uneven surface shape of the master defines a corner cube array shape.

In a retroreflective display device according to the present invention, including a corner cube array and a reflective layer that has been formed on the corner cube array, the retroreflectivity of the reflective layer can be increased with electrical connection maintained between the reflective layer and switching elements. As a result, the contrast ratio on the screen can be increased.

Also, according to the present invention, such a reflective display device can be fabricated more easily by a more productive method.

Other features, elements, processes, steps, characteristics and advantages of the present invention will become more apparent from the following detailed description of preferred embodiments of the present invention with reference to the attached drawings.

Figure 19:
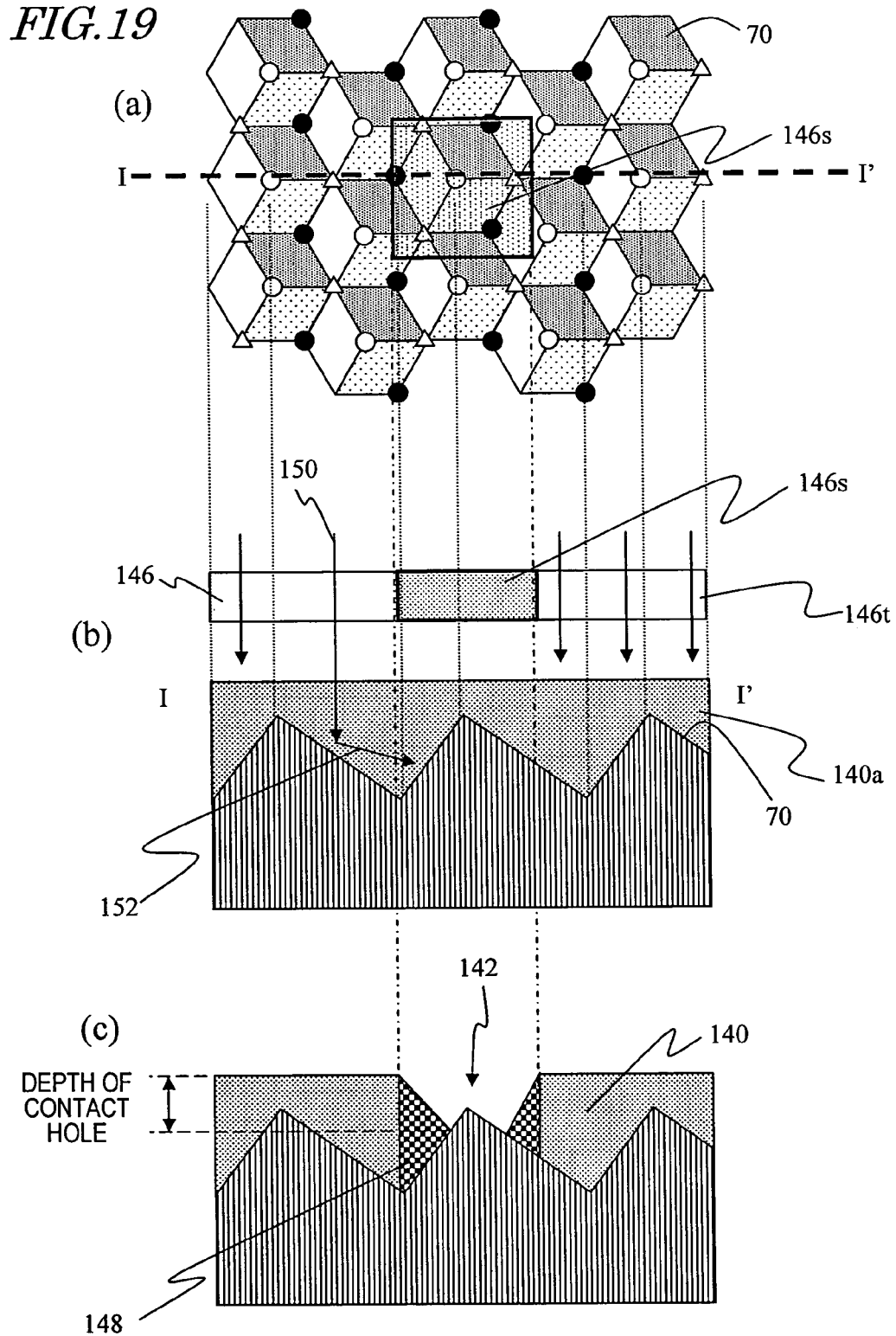

Portions (a) and (b) of FIG. 19 are respectively a plan view and a cross-sectional view illustrating an exposure process step to be performed on a negative photosensitive resin film and portion (c) of FIG. 19 is a cross-sectional view illustrating a development process step to be carried out on the negative photosensitive resin film.

DETAILED DESCRIPTION OF PREFERRED EMBODIMENTS

To improve the display performance of a retroreflective liquid crystal display device by increasing the retroreflectivity of its reflective layer, it is important to increase the shape accuracy of the reflective layer. The present inventors discovered and confirmed via experiments that to conduct a display operation at a high contrast ratio using a reflective layer with an MCCA shape, the angle formed between any two adjacent planes that define the MCCA shape on the surface of the reflective layer is preferably controlled with an accuracy of less than 0.2 degrees. In other words, the angle defined between any two adjacent planes preferably falls within the range of 90±0.2 degrees.

According to the method that has already been described with reference to FIGS. 7A through 7D, a master 36 that has an uneven surface to define the MCCA is used. As disclosed in Japanese Patent Application Laid-Open Publication No. 2003-066211, which was also filed by the applicant of the present application, a highly accurate MCCA formed by etching anisotropically a crystal substrate may be used as the master 36. Even if such a master 36 with that high shape accuracy is used, the resultant interlevel dielectric layer 40 obtained by the transfer process may still have decreased shape accuracy. This is because in the boundaries between the resin layer 32 and the conductive portions 34 on the surface of the layer to be patterned 30, the respective resin materials will cure and shrink differently according to their respective properties as described above. That is why it is still difficult to form a reflective layer 46 with such high shape accuracy (i.e., the angle between any two adjacent planes is within 90±0.2 degrees) on the interlevel dielectric layer 40.

Consequently, to increase the accuracy of the MCCA shape formed by the transfer process, the layer on which the pattern will be transferred (i.e., the layer to be patterned) preferably has such a structure as to make flowability, rigidity, curing and shrinking properties and other properties substantially uniform over the portion to be deformed with the master (which will be referred to herein as a "shape transfer region"). For example, the layer to be patterned is preferably made of the same material over the entire shape transfer region.

Meanwhile, if the entire layer to be patterned is made of an insulating resin material, for example, then contact holes to electrically connect switching elements and pixel electrodes to each other have to be opened through the resultant insulating layer. In that case, the MCCA shape formed by the transfer process may collapse due to the presence of those contact holes.

With these problems in mind, the present inventors carried out extensive researches while paying special attention to the structure of the layer to be patterned. As a result, the present inventors discovered that by using a layer to be patterned including conductive members and an insulating layer that coats the conductive members and by exposing the upper surface of the conductive members only partially by a transfer process, an MCCA and a reflective layer with high shape accuracy can be formed while maintaining proper electrical connection between switching elements and pixel electrodes, thus acquiring the basic idea of the present invention.

Hereinafter, preferred embodiments of a reflective display device according to the present invention will be described with reference to the accompanying drawings.

Embodiment 1

Figure 9A:
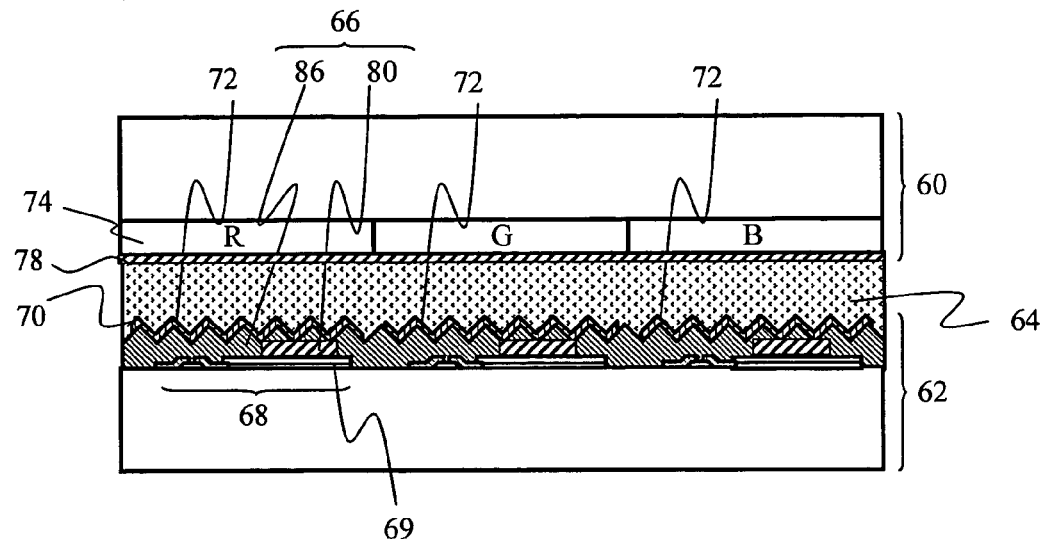
FIG. 9A is a schematic cross-sectional view illustrating a reflective display device according to a first preferred embodiment of the present invention.

FIG. 9A is a schematic cross-sectional view illustrating a first preferred embodiment of a reflective display device according to the present invention.

This reflective display device also includes a front substrate 60, a rear substrate 62 that faces the front substrate 60, and a liquid crystal layer 64 interposed between the front substrate 60 and the rear substrate 62. On the surface of the front substrate 60, stacked in this order are a plurality of color filters 74 and a transparent counter electrode 78 so as to face the liquid crystal layer 64. On the other hand, on the surface of the rear substrate 62, switching elements 68 are arranged for respective pixels so as to face the liquid crystal layer 64. In this preferred embodiment, TFTs are used as the switching elements 68. Between the switching elements 68 and the liquid crystal layer 64, interposed are a corner cube array 66 and a reflective layer 70, which has been formed on the corner cube array 66 so as to have a surface shape corresponding to that of the corner cube array 66. The arrangement pitch of the corner cube array 66 is equal to or smaller than that of the color filters 74. The corner cube array 66 includes a plurality of conductive members 80, which are arranged so as to be electrically connected to the drain electrodes 69 of their associated switching elements 68. The other portions of the corner cube array 66 where there are no conductive members 80 are an insulating layer 86 made of an insulating resin material, for example. The reflective layer 70 is made up of a plurality of pixel electrodes 72 that are separated from each other for respective pixels. And the reflective layer 70 functions not only as a retroreflector but also as pixel electrodes as well. As will be described later, each of the pixel electrodes 72 is in contact with the upper surface of its associated conductive member 80 and is electrically connected to the drain electrode 69 of its associated switching element 68 by way of the conductive member 80.

Figure 9B:
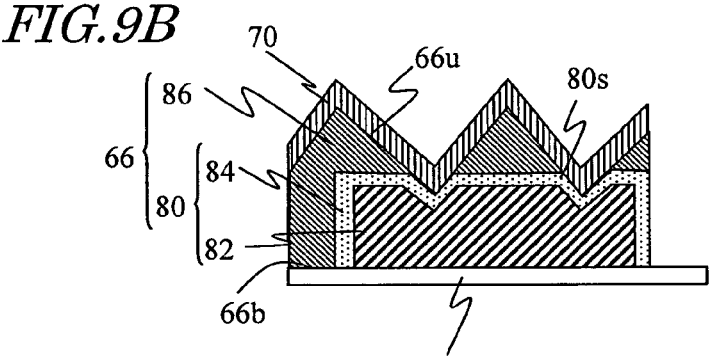
FIGS. 9B and 9C are respectively an enlarged cross-sectional view and a plan view illustrating the configuration of a corner cube array according to the first preferred embodiment.
Figure 9C:
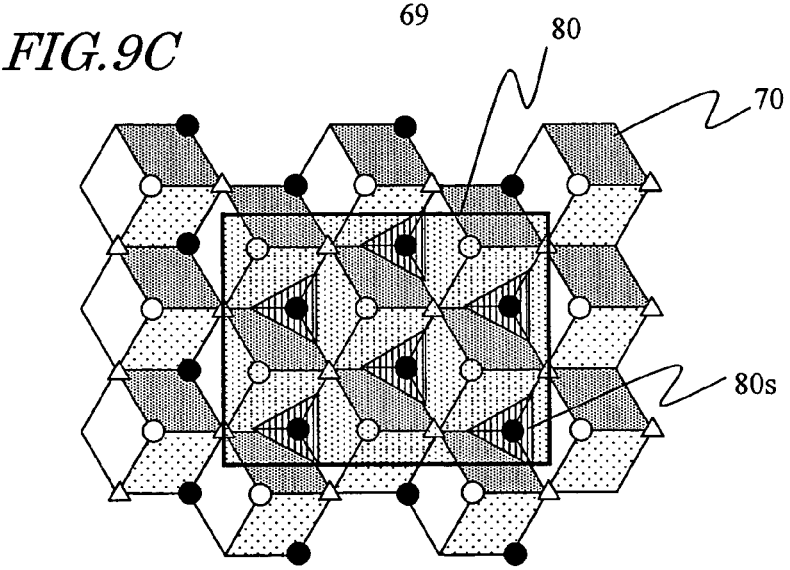

FIGS. 9B and 9C are respectively an enlarged cross-sectional view and a plan view illustrating the structure of the corner cube array 66 of this preferred embodiment. Each conductive member 80 is arranged between the bottom 66b and surface 66u of the corner cube array 66 and is electrically connected to the drain electrode 69 of its associated switching element. In this preferred embodiment, the conductive member 80 includes a resin layer 82 made of an insulating resin material and a conductive layer 84 that covers the resin layer 82.

As also can be seen from FIGS. 9B and 9C, a portion 80s of the upper surface of each conductive member 80 defines the surface of a corner cube at the lowest-level point thereof and is in contact with the reflective layer 70. That is to say, only the portion 80s of the upper surface of the conductive member 80 is exposed at the lowest-level point of the corner cube to define the corner cube array shape. And the other portions of the surface of the conductive member 80 are covered with the insulating layer 86.

As used herein, "to define the surface at the lowest-level point of a corner cube" means that the surface of a corner cube defined by that portion (which will be referred to herein as an "exposed portion") 80s of the surface of each conductive member 80 has a predetermined corner cube array shape. The surface portion of the corner cube array 66 defined by the exposed portion 80s of the conductive member 80 and another portion thereof (e.g., the portion defined by the insulating layer 86) preferably have substantially the same shape accuracy. As will be described later, such a corner cube array 66 may be formed by a transfer process. Also, the exposed portion 80s of the conductive member 80 may define either the entire surface of the corner cube at the lowest-level point thereof or just a part of the surface of the corner cube including the lowest-level point.

Furthermore, the "lowest-level portion of a corner cube" refers herein to a portion of a corner cube array, of which the height as measured from a plane including the lowest-level points of a plurality of corner cubes is equal to or smaller than a half of the height H of the corner cube. As used herein, the "lowest-level point" of a corner cube refers to the deepest point of the recess of the corner cube. On the other hand, the "height H of a corner cube" refers herein to the distance from the highest-level point of the three planes that define the corner cube to the plane including the lowest-level points of a plurality of corner cubes. It should be noted that these definitions of the lowest-level portion and the lowest-level point of the corner cube are applicable to not only the corner cube array 66 but also to the reflective layer 70 with the MCCA shape and to a transfer mold to make the corner cube array 66.

Figure 10:
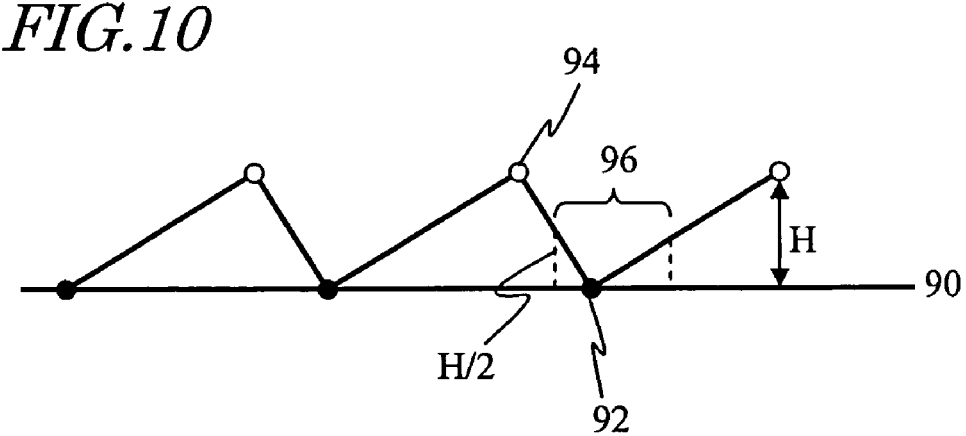
FIG. 10 is a schematic cross-sectional view showing the definition of the lowest-level points of corner cubes in a cubic corner cube array.

A cubic corner cube array will be described with reference to FIG. 10. In a cubic corner cube array, the height H of a corner cube is the distance H from the top 94 of the raised portion of the corner cube (which will be referred to herein as the "highest-level point") to the plane 90 including the lowest-level points 92 of a plurality of corner cubes. Thus, a lowest-level portion of the corner cube array refers herein to a portion 96 of a corner cube array, of which the height as measured from the plane 90 including the lowest-level points 92 of a plurality of corner cubes is equal to or smaller than a half of the height H of the corner cube (i.e., the height of the highest-level point 94). In other words, the lowest-level portion is a triangular pyramidal region, of which the top is defined by the lowest-level point 92 and of which the height is H/2. That is why when a cubic corner cube array is used as the corner cube array 66, the exposed portion 80s of the conductive member 80 defines at least a part of the three side surfaces of the triangular pyramidal region 96.

The liquid crystal layer 64 of this preferred embodiment is a scattering-type liquid crystal layer that is made of either a polymer dispersed liquid crystal material or a low-molecular-weight dispersed liquid crystal material (e.g., a polymer dispersed liquid crystal (PDLC)). And the liquid crystal layer 64 is preferably made of a reverse PDLC including a liquid crystal skeleton (such as a mesogen group) as its polymer structure. In this preferred embodiment, a voltage is applied by the transparent counter electrode and a pixel electrode 72 to the liquid crystal layer 64 on a pixel-by-pixel basis, thereby switching the optical properties of the liquid crystal layer 64 from a transparent state (when no voltage is applied thereto) into a scattering state (when a voltage is applied thereto). As a result, "white" is displayed when no voltage is applied to the liquid crystal layer but "black" is displayed when a voltage is applied to the liquid crystal layer because the liquid crystal layer becomes transparent and the incoming light is retroreflected.

It should be noted that the liquid crystal layer 64 of this preferred embodiment does not have to be the scattering type liquid crystal layer just described but may also be any other type of layer as long as its optical properties change with the voltage applied. Optionally, the liquid crystal layer 64 may even be replaced with any other type of modulating layer that has optical properties to change with the voltage applied.

Figure 4A:
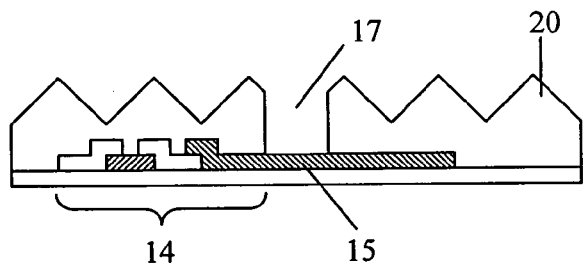
FIGS. 4A and 4B are schematic cross-sectional views illustrating an ordinary process for forming a reflective layer on a corner cube array.
Figure 4B:
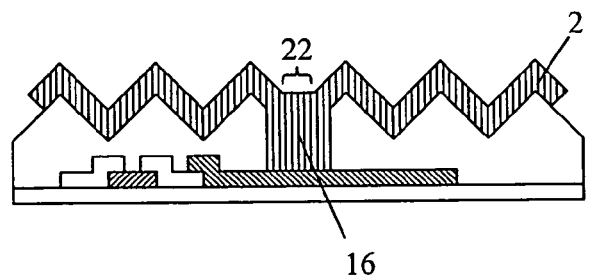
Figure 5A:
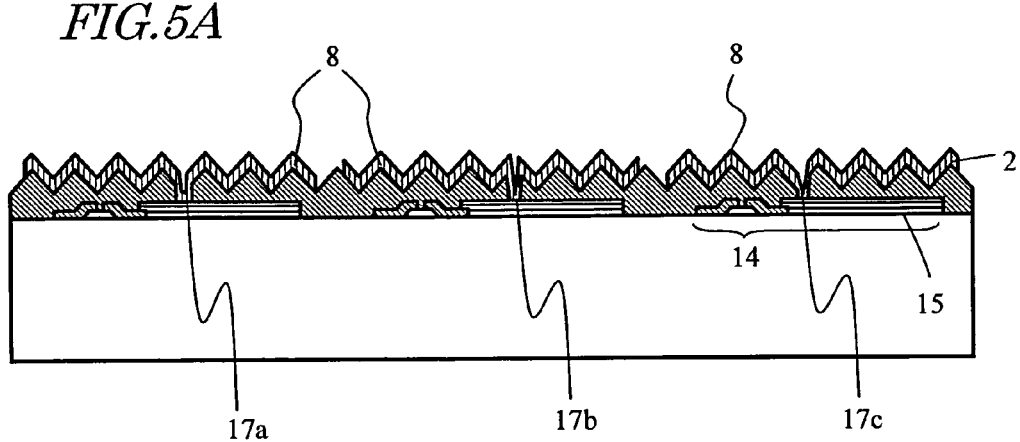
FIGS. 5A through 5D point out the problems of the process for forming a reflective layer as shown in FIGS. 4A and 4B.
Figure 5B:
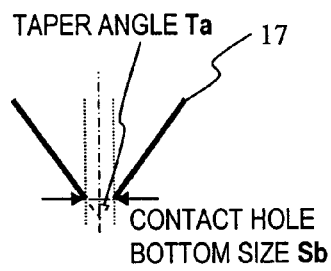
Figure 5C:
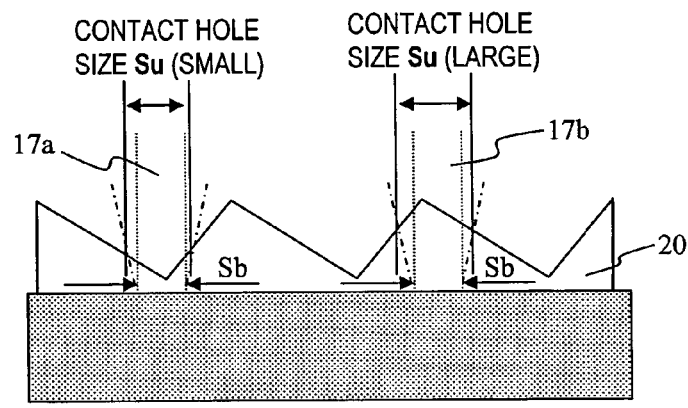
Figure 5D:
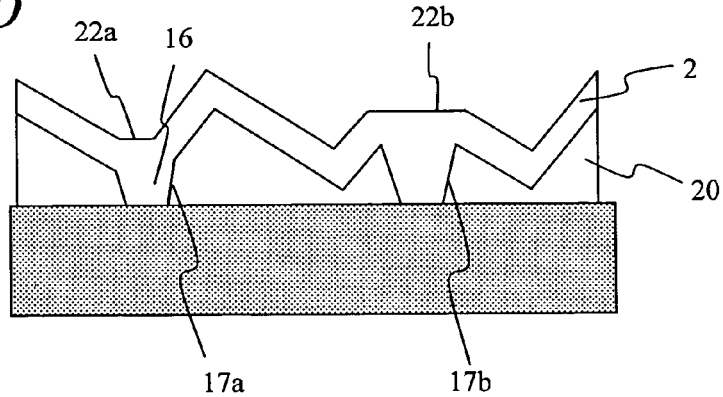
Figure 6:
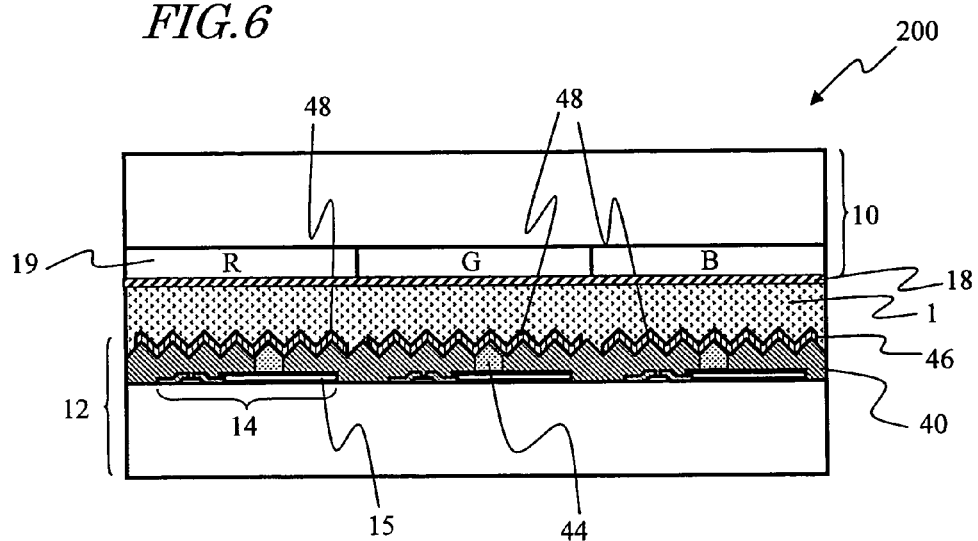
FIG. 6 is a schematic cross-sectional view illustrating the configuration of a reflective display device disclosed in Japanese Patent Application Laid-Open Publication No. 2003-255373.
Figure 7A:
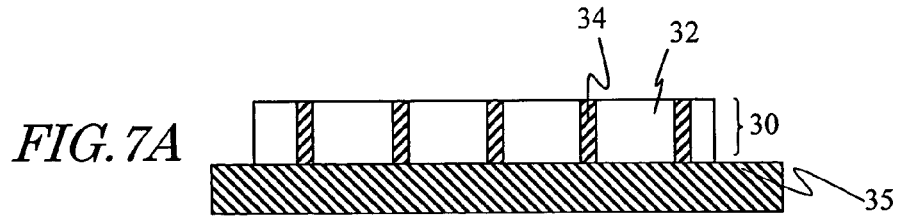
FIGS. 7A through 7D are cross-sectional views illustrating respective process steps for forming an interlevel dielectric layer and a reflective layer for the reflective display device shown in FIG. 6.
Figure 7B:
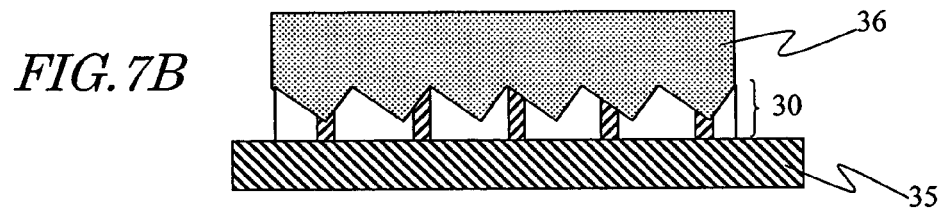
Figure 7C:
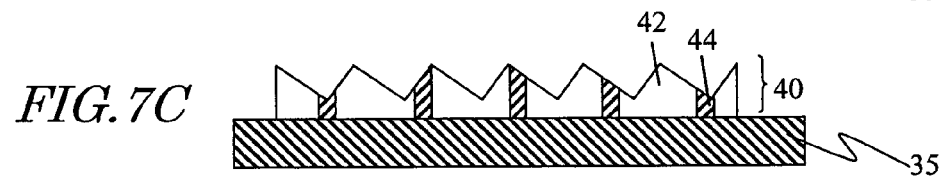
Figure 7D:
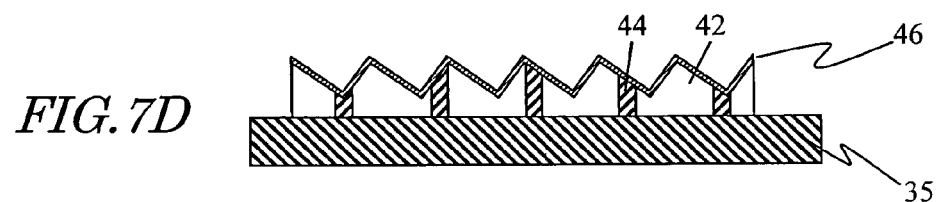
Figure 8A:
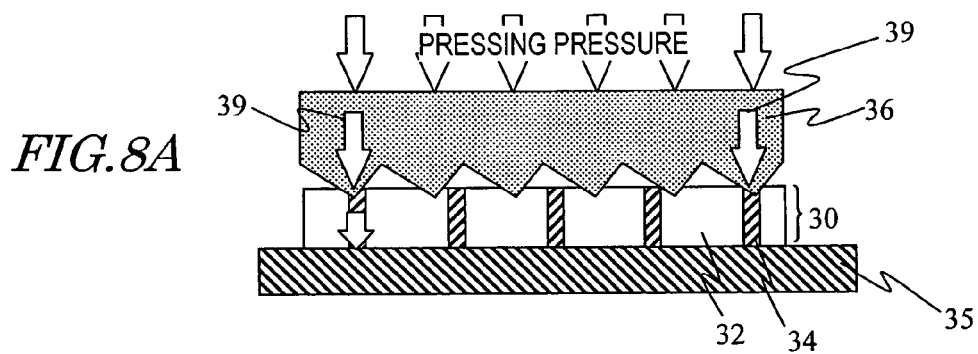
FIGS. 8A and 8B are schematic cross-sectional views illustrating the transfer process step shown in FIG. 7B in further detail.
Figure 8B:
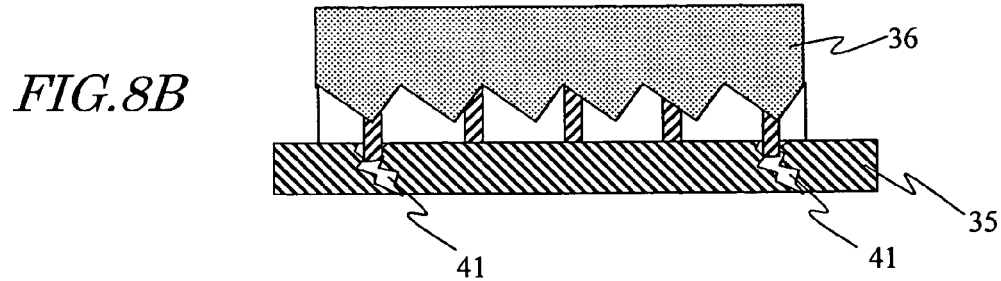

In the reflective display device of this preferred embodiment, electrical connection can be maintained between the switching elements 68 and the pixel electrodes 72 without deforming the corner cube array shape of the reflective layer 70. As a result, the retroreflectivity can be increased and an image of quality can be displayed. More specifically, since the corner cube array 66 has no contact holes, the reflective layer 70 does not have the non-retroreflective regions 22 such as those shown in FIG. 4B. Consequently, uniform retroreflectivity is realized all over the display area.

Besides, by forming a corner cube array 66 by the transfer process to be described later, the corner cube array 66 of the reflective layer 70 can have higher shape accuracy than that of the reflective layer formed by the method shown in FIGS. 7A through 7D. As a result, higher retroreflectivity and an image of higher quality are realized compared to conventional ones.

In this preferred embodiment, each conductive member 80 may have any shape such as a columnar shape (including a circular cylindrical shape and a prism shape) as long as at least a part of a surface of the conductive member 80 contacts with its associated switching element 68 and a part of the upper surface of the conductive member 80 contacts with its associated pixel electrode 72. Likewise, the materials of the resin layer 82 and the conductive layer 84 of the conductive member 80 are not limited to those mentioned with reference to FIG. 9B, either. Furthermore, according to this preferred embodiment, the conductive member 80 does not have to have the configuration shown in FIG. 9B, either, but may have any other configuration as long as at least a portion of the conductive member 80 has electrical conductivity and functions as a contact portion. Optionally, all of the conductive member 80 may have electrical conductivity. For example, the conductive member 80 may be a conductive resin layer made of a resin with electrical conductivity.

In this preferred embodiment, to electrically connect each pixel electrode 72 to its associated switching element 68, the upper surface of its associated conductive member 80 needs to be opposed to at least one lowest-level point of a corner cube and define a part of the surface of a lowest-level portion. To connect the pixel electrode 72 and the switching element 68 more securely, the upper surface of the conductive member 80 needs to be opposed to a plurality of lowest-level points of multiple corner cubes and define the respective surfaces of multiple lowest-level portions as shown in FIG. 9C. The shape and dimensions of each conductive member 80 are preferably determined such that the upper surface of the conductive member 80 is opposed to the lowest-level point of at least one corner cube, no matter where the conductive member 80 is located in the corner cube array 66. This is because in that case, the pixel electrode 72 and the switching element 69 can be electrically connected together even without aligning the arrangement pattern of the switching elements 68 on the TFT substrate with that of the corner cube array 66. For example, if the corner cube array 66 has an arrangement pitch of 10 μm and the conductive members 80 have a square upper surface in the reflective display device shown in FIG. 9A, the square upper surface preferably has a length of greater than $(2/\sqrt{3}) \times 10$ μm, more preferably 12 μm or more, each side.

Meanwhile, if the conductive member 80 were arranged to cover multiple adjacent pixels, then leakage current might flow between those pixels. That is why the maximum width of the upper surface of the conductive member 80 is preferably smaller than the arrangement pitch of pixels. As used herein, the "maximum width of the upper surface of the conductive member 80" refers to the diameter of a circular upper surface or to the longer side of a rectangular upper surface.

Hereinafter, a method for fabricating the reflective display device shown in FIGS. 9A through 9C will be described with reference to FIGS. 11A through 11K.

Figure 11A:
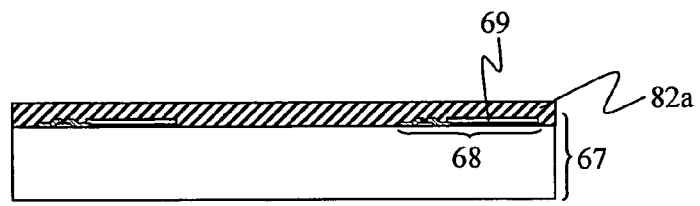
FIGS. 11A through 11k are cross-sectional views illustrating respective process steps for fabricating the reflective display device of the first preferred embodiment.

First, as shown in FIG. 11A, a resin layer 82a is formed on a substrate 67 that already includes switching elements (such as TFTs) 68 thereon. The resin layer 82a may be formed by coating the surface of the substrate 67 with a photosensitive resin material using a spin coater, a dye coater, a cap coater or any other coating machine. The photosensitive resin material may be an acrylic resin material, which is generally used as a material for the interlevel dielectric layer of a liquid crystal display device. The resin layer 82a does not have to be formed by the coating technique. Alternatively, a layer including a resin material such as a dry film may be attached onto the substrate 67. Furthermore, instead of the photosensitive resin material, any other resin material with shape retention capability such as a thermosetting resin material may also be used as material for the resin layer 82a.

Figure 1A:
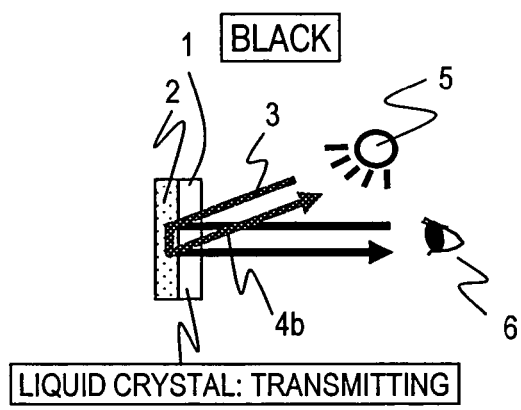
FIGS. 1A and 1B illustrate the operating principle of a retroreflective liquid crystal display device.
Figure 1B:
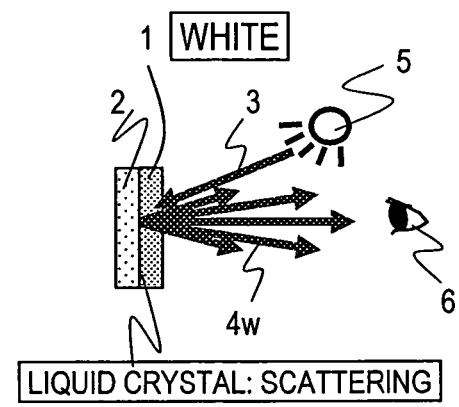
Figure 2:
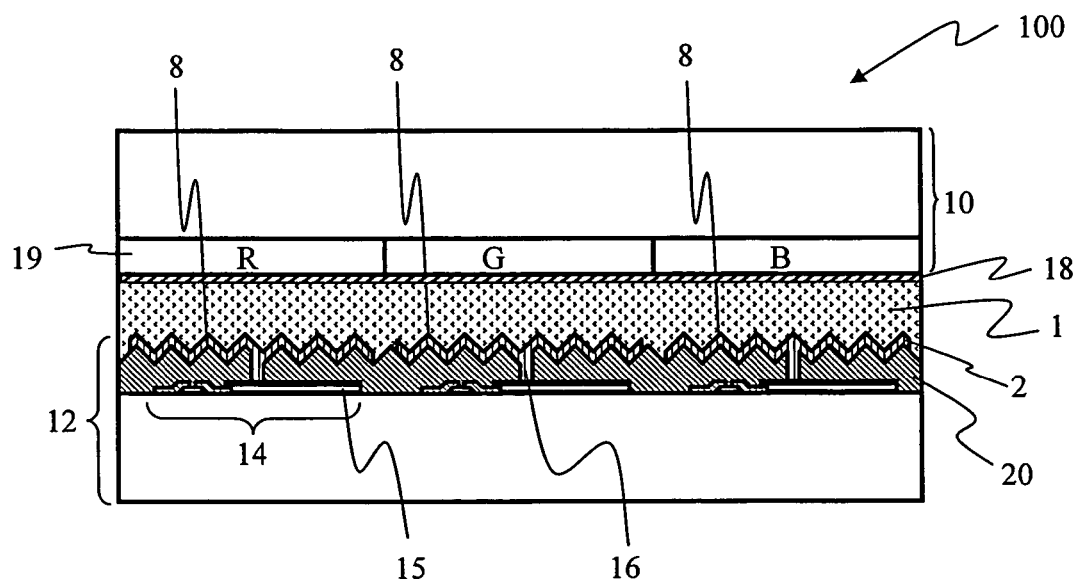
FIG. 2 is a schematic cross-sectional view illustrating a configuration for a conventional retroreflective liquid crystal display device.
Figure 11B:
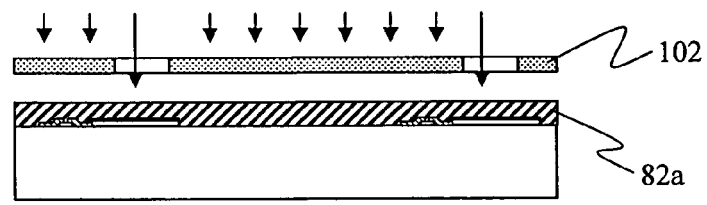
Figure 11C:
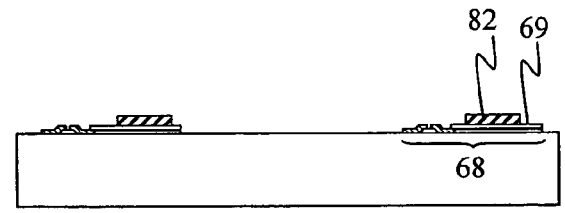
Figure 11D:
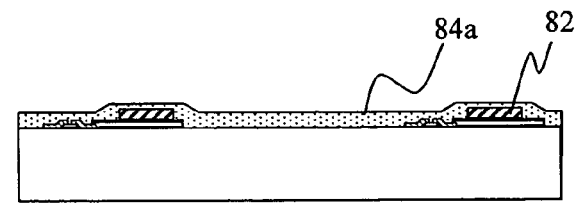

Next, as shown in FIG. 11B, the resin layer 82a is patterned by a photolithographic process using a photomask 102, thereby leaving the resin layer 82 (with a thickness of 2 μm, for example) over the respective drain electrodes 69 of the switching elements 68 on the substrate as shown in FIG. 1C. In this preferred embodiment, the upper surface of the resin layer 82 has a substantially square shape with dimensions of 40 μm square. Also, in the example illustrated in FIG. 1C, the resin layer 82 is formed on the surface of the drain electrode 69. However, the resin layer 82 does not have to be formed at this position but may also be arranged at any other position as long as a conductive layer to be deposited on the resin layer 82 in the process step to be described below can contact with the drain electrode 69.

Subsequently, as shown in FIG. 1D, a conductive thin film 84a is deposited so as to cover the resin layer 82 thinly. The conductive thin film 84a may be made of ITO with good step coverage.

Figure 11E:
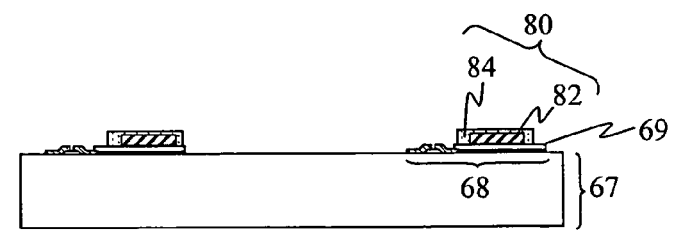

Thereafter, the conductive thin film 84a is patterned, thereby forming a conductive layer 84 as shown in FIG. 11E. Each portion of the conductive layer 84 covers the upper surface and side surfaces of its associated portion of the resin layer 82 and is connected to the drain electrode 69 of its associated switching element 68. In this manner, a conductive member 80 consisting of the resin layer 82 and the conductive layer 84 is obtained.

Figure 11F:
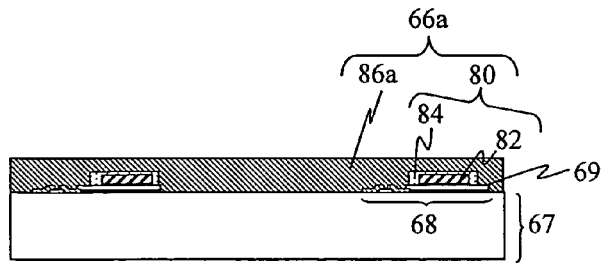

Next, as shown in FIG. 11F, a resin film 86a to be patterned is deposited over the conductive members 80 on the substrate 67. In this manner, the resin film 86a and the conductive members 80 form a layer to be patterned 66a. The resin film 86a may be formed by coating the surface of the substrate with a UV curable resin such as an acrylic resin MP-107 produced by Mitsubishi Rayon Co., Ltd. However, the material of the resin film 86a does not have to be a UV curable resin but may also be a thermosetting resin, for example. In this preferred embodiment, the resin film 86a is deposited all over the display area.

Figure 3A:
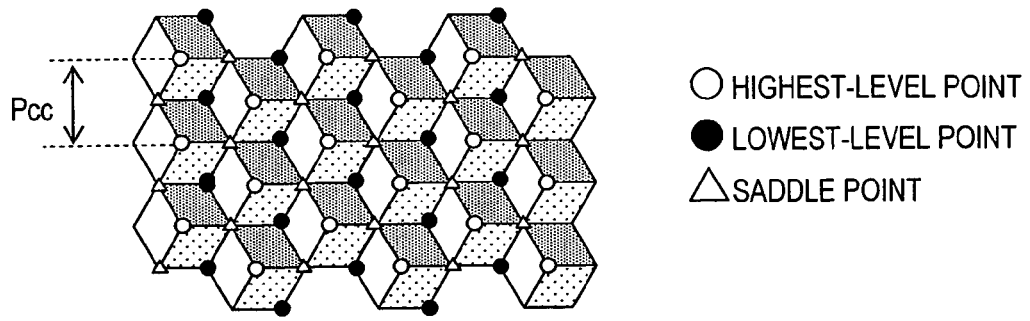
FIGS. 3A and 3B are respectively a plan view and a perspective view of a cubic corner cube array.
Figure 3B:
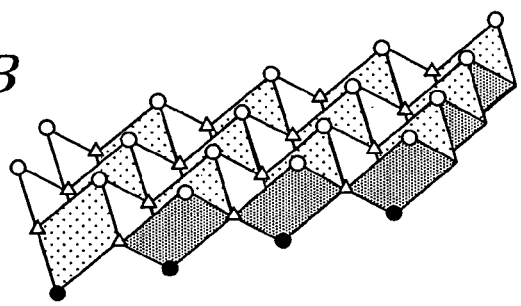
Figure 11G:
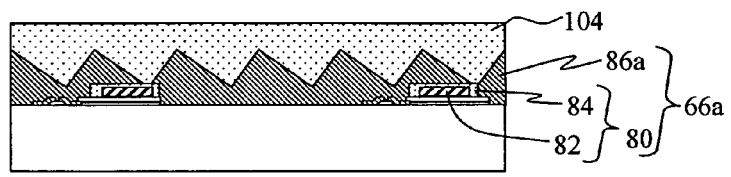

Thereafter, as shown in FIG. 11G, a master (such as a mold) 104 having an uneven surface shape to define a corner cube array is put on the surface of the layer to be patterned 66a, and the uneven surface shape of the master 104 is transferred onto the layer to be patterned 66a by a stamping process, for example. In this example, a Ni mold having an uneven surface shape that defines the cubic corner cube array (with an arrangement pitch of 10 μm) shown in FIG. 3 is used as the master 104. The transfer method is not particularly limited but may be the method disclosed in Japanese Patent Application Laid-Open Publication No. 2005-128421, which was filed by the applicant of the present application.

In the transfer process, predetermined pressure (i.e., pressing pressure) is applied onto the Ni master 104 and toward the substrate 67, thereby deforming the layer to be patterned 66a and exposing the upper surface of the conductive members 80 partially out of the resin film 86a. Subsequently, with the pressure continuously applied between the Ni master 104 and the substrate 67, the layer to be patterned 66a is irradiated with an ultraviolet ray. As a result, the resin film 86a in the layer to be patterned 66a cures to be an insulating layer 86. Thereafter, the master 104 is removed from the substrate 67. When the resin film 86a is made of a thermosetting resin, the resin film 86a may also be cured with heat.

This transfer process will be described more fully. If pressure is applied continuously onto the Ni master 104 that has been put on the layer to be patterned 66a, the resin film 86a in the layer to be patterned 66a is going to be deformed into the uneven surface shape of the Ni master 104. And at a certain point in time, the respective tops of the raised portions of the Ni master 104 (i.e., the highest-level points of corner cubes in the Ni master) go through the resin film 86a on the conductive members 80 and contacts with the upper surface of the conductive members 80. Since only the tops of the Ni master 104 contact with the upper surface of the conductive members 80 at this point in time, the pressing pressure will be focused on those points of contact. As a result, the conductive members 80 are plastically deformed into the shape of the Ni master 104. Consequently, the tops of the Ni master 104 penetrate into the conductive members 80.

Thus, by pressing the Ni master 104, not only the resin film 86a but also the conductive layer 84 and resin layer 82 in the conductive members 80 can be deformed plastically into the shape of the Ni master 104. As a result, the resin film 86a and the respective upper surfaces of the conductive members 80, which are exposed out of the resin film 86a, can be deformed into a predetermined shape.

Figure 12A:
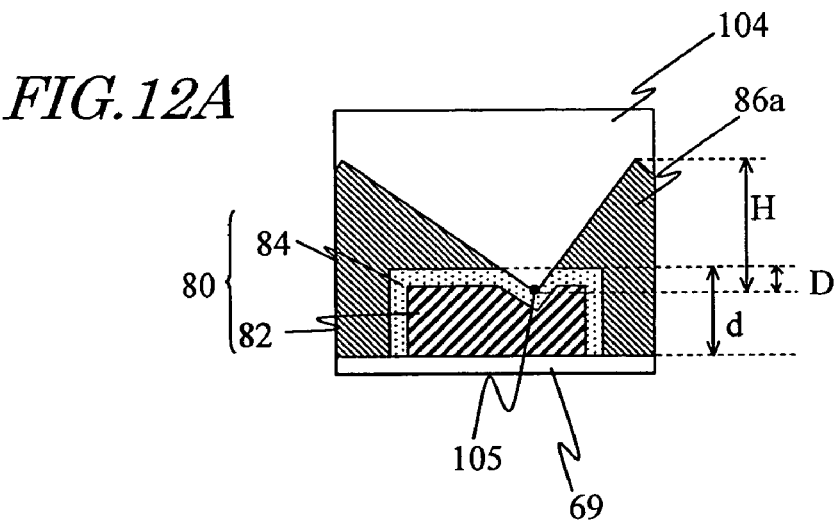
FIGS. 12A and 12B are enlarged cross-sectional views illustrating the process steps shown in FIGS. 11G and 11H in further detail.

FIG. 12A is an enlarged cross-sectional view illustrating the Ni master 104 that has been pressed and penetrated into the conductive member 80. In this case, either only a highest-level portion of the Ni master 104 or just a part of the highest-level portion is preferably penetrated into the conductive member 80. In other words, the depth D of the Ni master that has penetrated into the conductive member 80 is preferably controlled to a half or less of the height H of the corner cube on the Ni master. As used herein, the "highest-level portion of the Ni master 104" refers to a portion of the Ni master 104, of which the distance from a plane including a plurality of highest-level points is a half or less of the height H of the corner cubes. Also, the "depth D of the Ni master that has penetrated into the conductive member" refers to the distance from a highest-level point 105 of the Ni master 104 to the upper surface of the conductive member 80 (to which the Ni master 104 has not penetrated). Next, it will be described why the depth D (which will be referred to herein as a "penetration depth") is preferably controlled to H/2 or less.

If the depth D exceeded a half of the height H of a corner cube (i.e., if the Ni master 104 were forced into the conductive member 80 from the highest-level point 105 of the corner cube and beyond a saddle point thereof), then either the insulating resin material of the resin film 86a or an air bubble that was introduced when the Ni master 104 was put on the layer to be patterned 66a would stay forever around a lowest-level point of the Ni master 104. If such an air bubble has been introduced, such a portion will become a defect called a "void". On the other hand, if the insulating resin material has got stuck, then the insulating resin material will be enclosed between a portion to be deformed on the upper surface of the conductive member 80 and the Ni master 104. In that case, the pressing pressure to be applied between the Ni master 104 and the substrate 67 during the transfer process will be used to not only deform the conductive member 80 but also to compress the insulating resin material enclosed. That is to say, a decreased percentage of the pressing pressure will be applied onto the conductive member 80.

It should be noted that the depth D is controllable by changing the materials and thicknesses of the conductive member 80 and the layer to be patterned 66a, the shapes of the master 104 (or the arrangement pitches of corner cubes) and/or the pressing pressures. The depth D is preferably reduced to less than a half, more preferably a third or less, of the height H.

Also, the thickness of the conductive member 80 is preferably adjusted such that in the state shown in FIG. 12A, the highest-level point 105 of the Ni master 104 that has penetrated into the conductive member 80 is still located over some raised components (including TFTs and lines) that have been arranged in advance on the substrate (such as a TFT substrate) 67. In that case, the conductive member 80 can function as a sort of spacer in the transfer process, thus preventing the Ni master 104 from contacting with any of those raised components such as the switching elements 68 and lines on the substrate.

Consequently, considering the heights of those raised components on the substrate 67 and the penetration depth D of the Ni master 104, the thickness d of the conductive member 80 is preferably greater than the maximum height h of the raised components on the substrate 67 but smaller than the sum of the maximum height h of the raised components on the substrate 67 and a half of the height H of the corner cubes (i.e., h<d<(h+H/2)). According to the method described above, the thickness d of the conductive member 80 is defined by the thicknesses of the resin film 82a and the conductive film 84a.

Figure 11H:
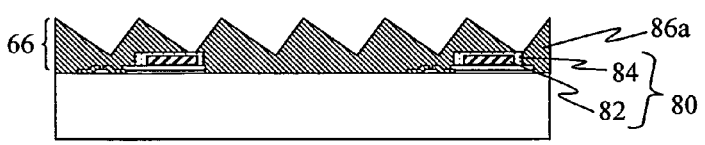
Figure 12B:
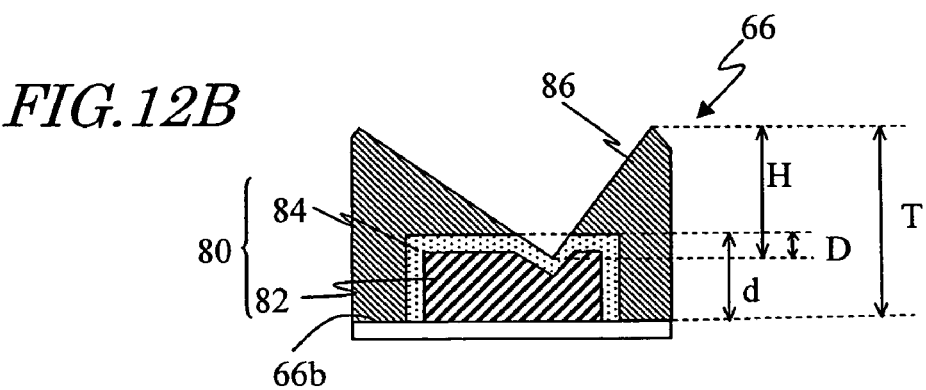

By performing such a transfer process, a corner cube array 66 such as that shown in FIG. 11H can be obtained. FIG. 12B is an enlarged cross-sectional view illustrating the corner cube array 66 shown in FIG. 11H. As shown in FIG. 12B, the upper surface of the conductive member 80 is partially exposed out of the insulating layer 86 at the lowest-level portion of the corner cube in the corner cube array 66. Also, the surface of the corner cube array 66 is defined by the insulating layer 86 and the respective upper surfaces of the conductive members 80 that are exposed out of the insulating layer 86.

The thickness of the corner cube array 66 that has been formed by the transfer process (i.e., the distance T from the bottom 66b of the corner cube array 66 to the highest-level points of the corner cubes) is calculated by subtracting the penetration depth D from the sum of the thickness d of the conductive member 80 and the height H of the corner cube (i.e., T=d+H−D). That is to say, as the conductive member 80 thickens, the corner cube array 66 thickens accordingly. That is why if the conductive member 80 were too thick (e.g., if d>10 μm), the thickness T of the corner cube array 66 would be much greater here and there than the cell thickness. If a rear substrate 62 including such a corner cube array 66 were bonded onto the front substrate 60, then the cell thickness would vary easily, which is not beneficial to increase the productivity. On top of that, if the conductive member 80 is formed by coating the resin layer 82 with the conductive layer 84, the conductive member 80 with such an excessive thickness d might cause insufficient conductivity in the conductive layer 84.

Thus, in view of these process- and performance-related considerations, the thickness d of the conductive members 80 is preferably at most 10 μm and more preferably 5 μm or less (e.g., 2 μm). Then, the conductive members 80 can be used as spacers during the transfer process and the varied cell thickness or insufficient conductivity described above can be eliminated with more certainty.

In the transfer process described above, if the thickness d of the conductive member 80 has been adjusted such that the highest-level point 105 of the Ni master 104 that has penetrated into the conductive member 80 is still located over the raised components on the substrate 67, then the lowest-level points of the corner cube array 66 will be higher than the raised components on the substrate 67.

Figure 11I:
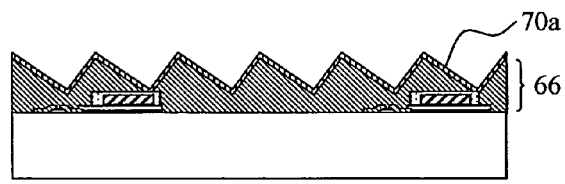

Thereafter, as shown in FIG. 11I, a metal film 70a of a reflective metal such as Ag is formed on the surface of the corner cube array 66 by an evaporation process, for example. The reflective film 70a does not have to be made of Ag but may also be made of a highly reflective metal such as Al or an alloy consisting mostly of Al or Ag. The metal film does not have to be formed by the evaporation process, either, but may also be formed by a sputtering process or a wet deposition process such as a plating process. As another alternative, the metal film 70a may also be formed by applying a solution of a metal material onto the surface of the corner cube array.

Figure 11J:
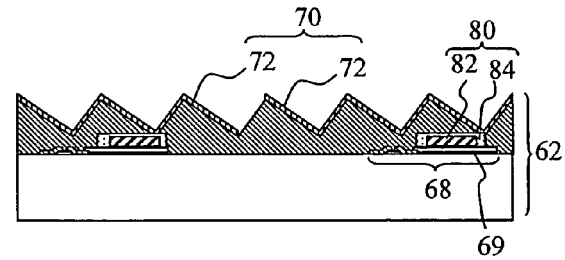

Subsequently, as shown in FIG. 11J, the resultant metal film 70a is patterned and divided into respective pixels, thereby obtaining a reflective layer 70 consisting of a plurality of pixel electrodes 72. The metal film 70a may be patterned by the method disclosed in Japanese Patent Application No. 2004-246495, which was filed by the applicant of the present application. Each pixel electrode 72 of the reflective layer 70 contacts with the upper surface of its associated conductive member 80 that has been exposed as a result of the transfer process. In this arrangement, each pixel electrode 72 is electrically connected to the drain electrode 69 of its associated switching element 68 by way of the conductive layer 84 of its associated conductive member 80. Consequently, a rear substrate 62 for a display device is completed.

In the meantime, a front substrate 60 is prepared by arranging color filters 74 according to the pattern of the pixel electrodes 72 and forming a transparent counter electrode 78 of ITO thereon. If necessary, a liquid crystal alignment film (not shown) is applied on the respective surfaces of this front substrate 60 and the rear substrate 62 that has been obtained as described above.

Figure 11K:
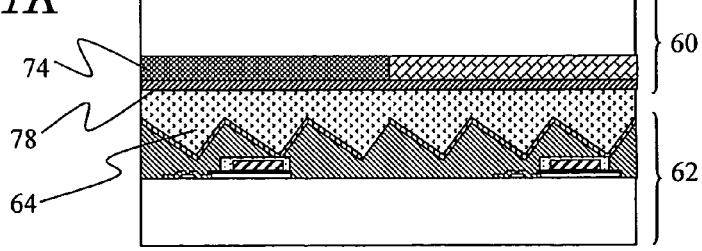

Thereafter, the front and rear substrates 60 and 62 are bonded together with an adhesive and with spacers (not shown) dispersed between them such that the pixel electrodes 72 face the transparent counter electrode 78. And then a polymer dispersed liquid crystal material is injected into the gap between the substrates 60 and 62 and the port is sealed, thereby forming a liquid crystal layer 64. In this manner, a reflective liquid crystal display device such as that shown in FIG. 11K is completed.

The reflective display device of this preferred embodiment is fabricated by the method described above, and therefore, has the following advantages over the method of Japanese Patent Application Laid-Open Publication No. 2003-255373 that has already been described with reference to FIGS. 7A through 7D.

As described above, according to the method disclosed in Japanese Patent Application Laid-Open Publication No. 2003-255373, the corner cube array formed by a transfer process may have decreased shape accuracy. In addition, in the transfer process, the glass substrate could be broken or electrically conductive foreign matter might enter the insulating layer.

In contrast, according to the method that has just been described with reference to FIGS. 11A through 11K, a corner cube array with high shape accuracy can be made easily by a transfer technique. More particularly, in the transfer process, the portion to be deformed in the layer to be patterned 66a (which will be referred to herein as a "pattern forming region") mostly consists of the resin film 86a. For that reason, the deterioration in shape accuracy that would be caused due to the different curing and shrinking properties between the material of the resin film 86a and the material of the conductive member 80 in the layer to be patterned 66a can be reduced significantly. Thus, the layer to be patterned 66a can be deformed substantially uniformly, and therefore, the resultant corner cube array 66 can have higher shape accuracy than the conventional one. As a result, a reflective layer 70 with high shape accuracy can be formed on the corner cube array 66, thus improving the retroreflectivity significantly.

Figure 12C:
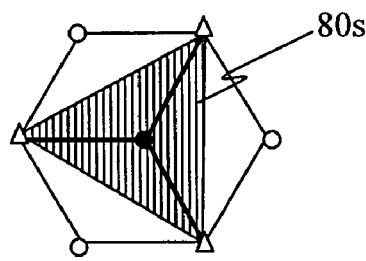
FIGS. 12C and 12D are plan views showing where the upper surface of a conductive member is deformed in a situation where the embedding depth D is H/2 and in a situation where the embedding depth D is H, respectively.
Figure 12D:
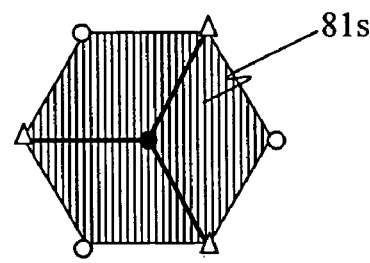

Besides, according to the method that has just been described with reference to FIGS. 11A through 11K, there is no need to deform the conductive member 80 greatly by the transfer process. Thus, a lower pressing pressure may be applied in the transfer process. Suppose pressure is applied in the transfer process step shown in FIGS. 11G and 12A such that the highest-level portions of the master 104 (i.e., the triangular pyramidal regions that range from the highest-level points of the master 104 to the plane including saddle points)

are penetrated entirely into the conductive members 80. In that case, the depth D of the portions of the master 104 that have been penetrated into the conductive members 80 (i.e., the penetration depth) becomes a half of the height H of the corner cubes of the master 104. FIG. 12C is a plan view illustrating a region of the upper surface of the conductive member 80 that is deformed by the master 104 in a single corner cube. On the other hand, if the pressure is applied as in the process shown in FIGS. 7A through 7D such that the master 104 is penetrated to the lowest-level points thereof (i.e., such that the depth D becomes equal to the height H of the corner cubes), then the corner cubes are formed with the upper surface of the conductive members 80 deformed. In that case, the region 81s of the upper surface of the conductive member 80 that has been deformed by the master 104 is shown in FIG. 12D. As can be seen by comparing FIGS. 12C and 12D with each other, if the penetration depth D is equal to H/2, the area of the deformed portion on the upper surface of the conductive member 80 can be halved, and the pressing pressure to be applied to deform the conductive member 80 can be reduced to a half or less, compared to the situation where the penetration depth D is equal to H. It should be noted that if the pressure is applied such that the depth D becomes less than a half (more preferably, one third or less) of the height H of the corner cubes, the pressing pressure can be further reduced.

As described above, since the pressing pressure can be reduced in the transfer process, the damage that could be done on the substrate 67 due to excessive pressing pressure can be reduced and the problem of damaged substrate 67 can be avoided. In addition, the press machine for use in the transfer process can be simplified, too.

Furthermore, in the transfer process described above, the deformation of the conductive member 80 due to the pressing pressure can be reduced significantly. That is why the chances of generating dust (i.e., electrically conductive foreign particles) due to the collapse of the conductive particles in the conductive member 80 under the pressing pressure are very slim. Consequently, it is possible to avoid the unwanted situation where electrically conductive foreign particles scatter in the press machine or enter the insulating layer 86 of the corner cube array 66.

What is more, the conductive members 80 function as a sort of spacers during the transfer process. As a result, it is possible to prevent the master 104 from contacting with the switching elements 68 on the substrate 67 under the pressing pressure.

On top of that, even without matching the arrangement pattern of the conductive members 80 to that of the corner cube array 66, the pixel electrodes 72 and the switching elements 68 can be electrically connected together at the lowest-level portions of the corner cubes (i.e., portions of the reflective layer 70 that are located closest to the drain electrodes 69 of the switching elements 68). Consequently, the contact resistance can be reduced more effectively compared to the situation where the pixel electrodes 72 and the switching elements 68 are connected together at the highest-level portions of the corner cubes. Particularly when a conductive resin material, obtained by mixing conductive particles into a resin binder, is used as the material of the conductive members 80, the resistivity of the conductive members 80 increases due to the presence of the resin. In that case, if the pixel electrodes 72 and the conductive members 80 make an electrical contact with each other at the lowest-level portions of the corner cubes, then the current needs to flow a shorter distance through the conductive members 80. As a result, the contact resistance can be reduced effectively.

The manufacturing process of this preferred embodiment does not have to be performed in accordance with the method shown in FIGS. 11A through 11K. For example, in the transfer process step using the master 104, the layer to be patterned 66a is made of an uncured resin material (such as a monomer or an oligomer) and then the resin material is cured with the master 104 pressed. However, any other type of resin material, curing method or curing condition may be adopted if it is appropriate. Alternatively, the transfer may also be done by utilizing the property of a resin material that deforms under pressure or with heat (i.e., plastic deformation or thermoplasticity). As another alternative, the transfer may also be done by using a film of photosensitive resin as disclosed in Japanese Patent Application Laid-Open Publication No. 2001-75090, which was also filed by the applicant of the present application.

The master 104 for use to make the corner cube array 66 of this preferred embodiment may be made by the method disclosed in Japanese Patent Application Laid-Open Publication No. 2003-066211 and Japanese Patent Application Laid-Open Publication No. 2001-75090, both of which were filed by the applicant of the present application. Specifically, the master 104 may be obtained by subjecting a crystal substrate to an anisotropic etching process. Alternatively, the master 104 may also be made by transferring a mold obtained by such a method.

The material of the liquid crystal layer 64 is not particularly limited but is preferably a polymer dispersed liquid crystal material. The polymer dispersed liquid crystal material may be obtained by preparing a mixture of a low-molecular-weight liquid crystal composition and an unpolymerized prepolymer in a miscible state, injecting the mixture into the gap between the transparent substrates and then polymerizing the unpolymerized prepolymer. The type of the prepolymer is not particularly limited, either, but is preferably a UV-curing prepolymer. If a UV-curing prepolymer is adopted, there is no need to heat the mixture during the polymerization and the other members will not be affected by the heat.

In this preferred embodiment, a mixture of a UV-curing prepolymer with liquid crystalline properties and a liquid crystal composition (i.e., a prepolymer-liquid crystal mixture) is photo-cured by being irradiated with an active ray such as an ultraviolet ray, and the cured mixture is used as the polymer-dispersed liquid crystal material. The prepolymer-liquid crystal mixture may be obtained by adding a small amount of polymerization initiator (produced by Ciba-Geigy Corporation, for example) to a mixture of a UV-curing material and a liquid crystal composition that have been mixed at a weight ratio of 20:80, for example. The prepolymer-liquid crystal mixture obtained in this manner exhibits a nematic liquid crystal phase at an ordinary temperature.

The configuration of the reflective display device of this preferred embodiment is not limited to that shown in FIGS. 9A through 9C. For example, a flattening layer may be arranged on the reflective layer 70 to flatten the uneven surface shape of the reflective layer 70 and transparent upper-level pixel electrodes may be arranged on the flattening layer.

Figure 13:
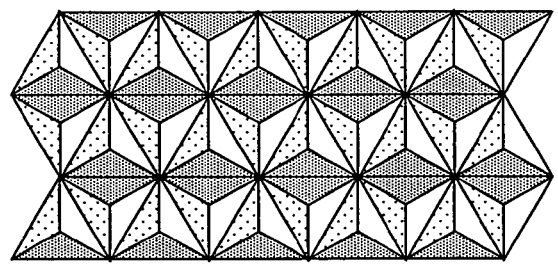
FIG. 13 is a plan view illustrating another corner cube array according to the first preferred embodiment.

In the preferred embodiment described above, the corner cube array 66 is a cubic corner cube array consisting of multiple corner cubes, each of which is defined by three substantially square planes that are opposed perpendicularly to each other. However, any other type of corner cube array may also be used. For example, the corner cube array may consist of corner cubes, each of which is defined by three rectangular isosceles triangular planes that are opposed perpendicularly to each other as shown in FIG. 13. Even when the corner cube array shown in FIG. 13 is adopted, the "lowest-level portion of a corner cube" also refers to a portion of the corner cube, of which the height as measured from a plane including the lowest-level points of multiple corner cubes is a half or less of the height H of the corner cube. In this case, the "height H of a corner cube" refers the distance from a plane including the bottom sides of the rectangular isosceles triangles of that corner cube to a plane including the lowest-level points of multiple corner cubes.

The arrangement pitch of the corner cube array 66 is not particularly limited but may be equal to or longer than the wavelength of visible radiation and equal to or smaller than the maximum width of pixels. Then, color mixture and other problems in display performance can be minimized. It should be noted that according to the method of making a corner cube array 66 by a transfer process that has already been described with reference to FIGS. 11A through 11K, even if the arrangement pitch of the corner cubes is small, a corner cube array 66 can still be formed with high accuracy. Thus, it is particularly advantageous to apply the method described above to forming a corner cube array of a very small size (with a pitch of 2.5 μm or less, for example).

Embodiment 2

Hereinafter, a second preferred embodiment of a reflective display device according to the present invention will be described.

The reflective display device of this preferred embodiment has the same configuration as the counterpart of the first preferred embodiment that has already been described with reference to FIGS. 9A and 9B. In this preferred embodiment, however, the conductive members 80 of the corner cube array 66 are made of a different material and have a different structure from the counterparts of the first preferred embodiment described above. More specifically, although only a portion of each conductive member 80 (i.e., the conductive layer 84) is made of an electrically conductive material in the first preferred embodiment, every conductive member 80 is entirely made of a material with electrical conductivity according to this preferred embodiment.

Figure 14A:
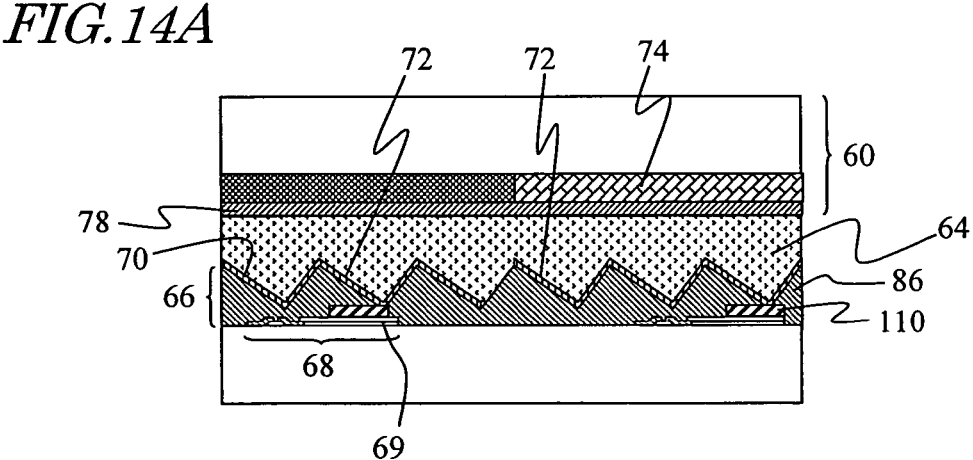
FIG. 14A is a schematic cross-sectional view illustrating a reflective display device according to a second preferred embodiment of the present invention and FIG. 14B is an enlarged cross-sectional view illustrating the configuration of a corner cube array according to the second preferred embodiment.
Figure 14B:
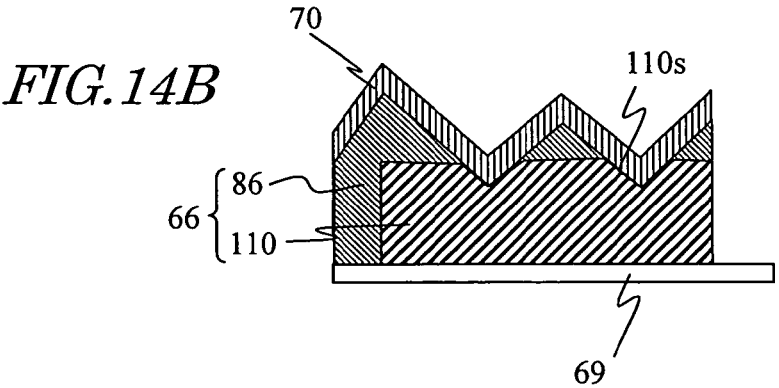

FIG. 14A is a schematic cross-sectional view illustrating a reflective display device according to this preferred embodiment and FIG. 14B is an enlarged cross-sectional view illustrating the configuration of a corner cube array according to this preferred embodiment. If any of these components of the reflective display device has the same function as the counterpart shown in FIGS. 9A and 9B, that pair of components will be identified by the same reference numeral and the description thereof will be omitted herein for the sake of simplicity.

As in the first preferred embodiment described above, the corner cube array 66 of this preferred embodiment also includes a plurality of conductive members 110. Each of those conductive members 110 is arranged so as to make an electrical contact with the drain electrode 69 of its associated switching element 68 on the substrate. Also, a portion 10s of the upper surface of each conductive member 110 defines the surface of a lowest-level portion of the corner cube array 66 and is electrically connected to the reflective layer 70. In this preferred embodiment, each conductive member 110 is a conductive layer made of a material with electrical conductivity, and the entire conductive member 110 has electrical conductivity. The conductive member 110 may be made of an electrically conductive resin, for example. As used herein, the "electrically conductive resin" may also be a conductive material dispersed resin, obtained by dispersing fine particles of an electrically conductive material (such as Ag) in an electrically insulating resin (such as an acrylic resin), or an organic conductive compound in which the polymer itself has electrical conductivity.

Hereinafter, a method for fabricating the reflective display device shown in FIGS. 14A and 14B will be described with reference to FIGS. 15A through 15I.

Figure 15A:
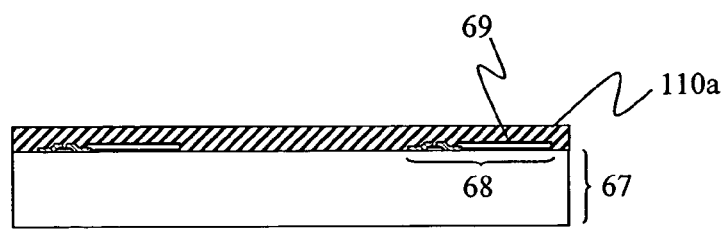
FIGS. 15A through 15I are cross-sectional views illustrating respective process steps for fabricating a reflective display device according to the second preferred embodiment.

First, as shown in FIG. 15A, a conductive resin layer 110a is formed on a substrate 67 that already includes switching elements (such as TFTs) 68 thereon. The conductive resin layer 110a may be formed by coating the substrate 67 with a conductive material dispersed resin (produced by Noritake Company Ltd., for example), in which Ag fine particles are dispersed in a resin with photosensitivity, by a screen printing process. The material of the conductive resin layer 110a and the method of forming the layer 110a are not limited to these examples.

Figure 15B:
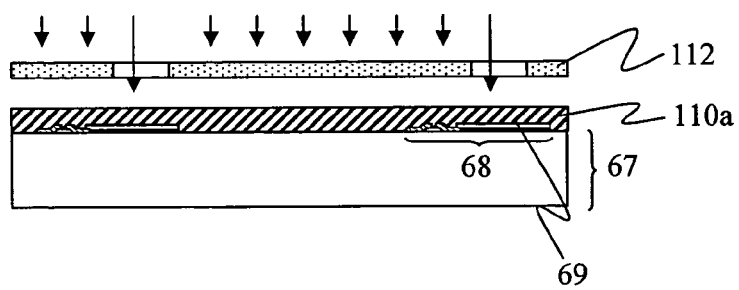
Figure 15C:
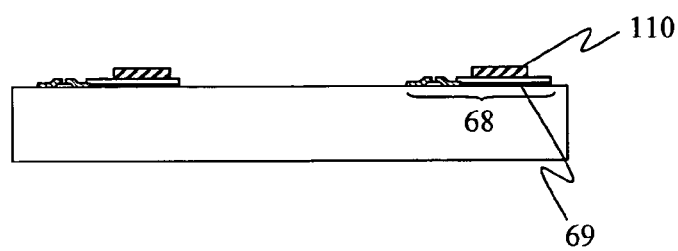

Next, as shown in FIG. 15B, the conductive resin layer 110a is patterned by a photolithographic process using a photomask 112, thereby leaving the conductive resin layer (i.e., conductive members) 110 over the respective drain electrodes 69 of the switching elements 68 on the substrate as shown in FIG. 15C. In this preferred embodiment, the conductive members 110 have a thickness of 2 μm and the upper surface of the conductive members 110 has a substantially square shape with dimensions of 40 μm square.

Figure 15D:
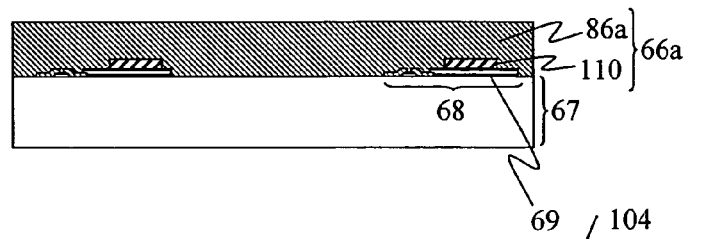

Thereafter, as shown in FIG. 15D, a resin film to be patterned 86a is deposited over the substrate 67 so as to cover the conductive members 110. The material of the resin film 86a may be the same as that mentioned with reference to FIG. 11F, for example. In this manner, the resin film 86a and the conductive members 110 form a layer to be patterned 66a.

Figure 15E:
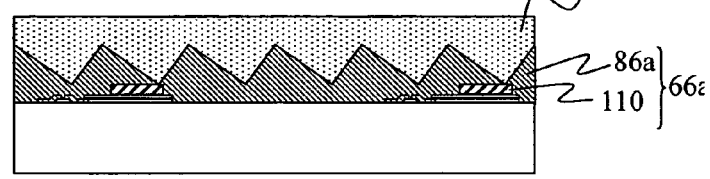

Thereafter, as shown in FIG. 15E, a master (such as a Ni mold) 104 is put on the surface of the layer to be patterned 66a, and the uneven surface shape of the master 104 is transferred onto the layer to be patterned 66a by a stamping process, for example. The transfer process may be carried out as already described with reference to FIGS. 11G and 12A. As a result, the upper surface of each conductive member 110 is partially exposed out of the resin film 86a, and not only the resin film 86a but also the respective upper surfaces of the conductive members 110 that are exposed out of the resin film 86a can be deformed into the uneven surface shape of the master 104. The shape of the master 104 and the method of making the master 104 may be the same as those described with reference to FIG. 11G.

Figure 15F:
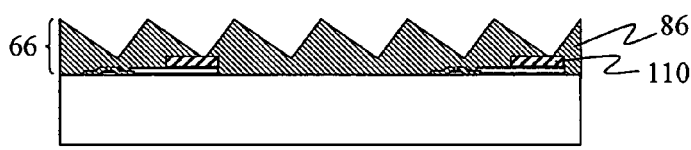

By performing such a transfer process, a corner cube array 66 such as that shown in FIG. 15F can be obtained. In the corner cube array 66, the upper surface of each conductive member 110 is partially exposed at the lowest-level portion of its associated corner cube, thereby defining a predetermined corner cube array shape.

Figure 15G:
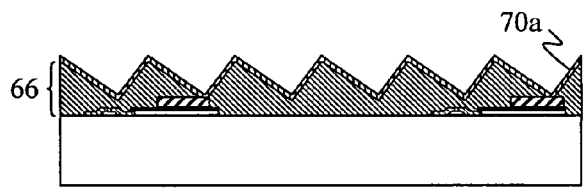
Figure 15H:
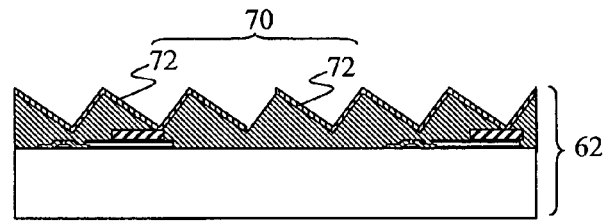

Thereafter, as shown in FIG. 15G, a metal film 70a is deposited on the surface of the corner cube array 66 and then patterned, thereby forming a reflective layer 70 including a plurality of pixel electrodes 72 as shown in FIG. 15H. The material of the metal film 70a, the method of forming the metal film 70a, and the method of patterning the metal film 70a may be the same as those already described with reference to FIGS. 11I and 11J. In this manner, a rear substrate 62 for a display device can be obtained.

Figure 15I:
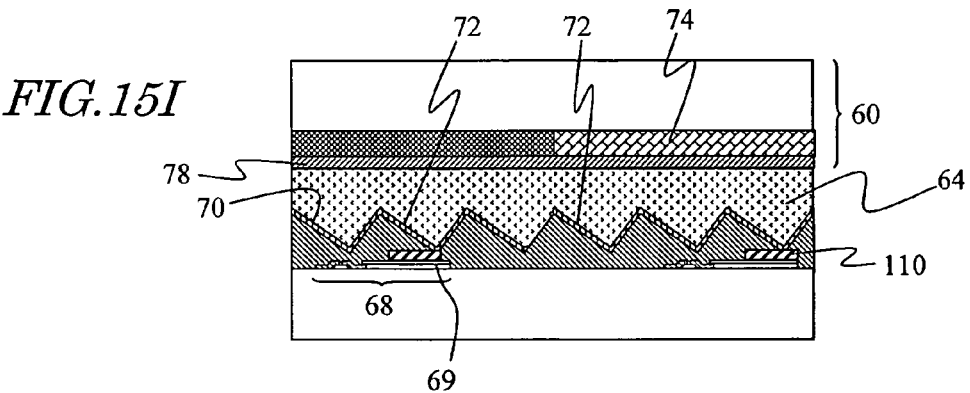

A reflective liquid crystal display device such as that shown in FIG. 15I can be fabricated by the same method as that already described with reference to FIG. 11K using the rear substrate 62 obtained as described above.

In the first preferred embodiment described above, to form the conductive members 80, the resin film 82a and the conductive film 84a need to be deposited and patterned separately as already described with reference to FIGS. 11A through 11K. On the other hand, according to the method of this preferred embodiment, the conductive members 110 can be formed just by depositing and patterning the conductive resin film 110a. As a result, the number of depositing and patterning (more specifically, photolithographic and etching) process steps to perform can be reduced and the manufacturing process can be simplified.

According to the method that has just been described with reference to FIGS. 15A through 15I, a conductive resin is used as the material of the conductive members 110. Alternatively, a metal may be used instead. As described above, a metal generally has higher rigidity than a resin material, and higher pressure (i.e., pressing pressure) is needed to deform a metal. According to this preferred embodiment, however, the conductive members 110 need to be deformed much less significantly. That is why the conductive resin film can be plastically deformed into a predetermined corner cube array shape without increasing the pressing pressure. As a result, the contact resistance can be reduced while maintaining the shape accuracy of the corner cube array 66.

Hereinafter, a method of making the conductive members of a metallic material will be described with reference to FIGS. 16A through 16E.

Figure 16A:
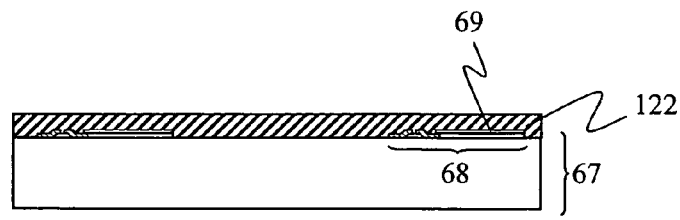
FIGS. 16A through 16E are cross-sectional views illustrating another set of process steps for forming a conductive member according to the second preferred embodiment.

First, as shown in FIG. 16A, a photoresist film of a photosensitive resin (with a thickness of 5 μm, for example) is formed over the substrate 67 that already includes switching elements 68 thereon. In this example, photoresist TGMR-950BE (produced by Tokyo Ohka Kogyo Co., Ltd.) is used as the photosensitive resin.

Figure 16B:
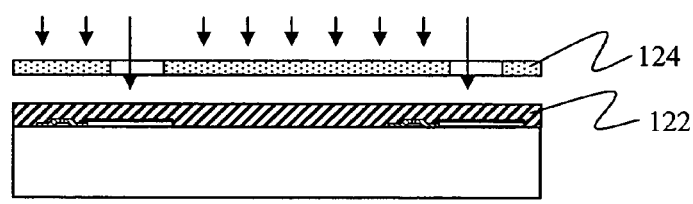
Figure 16C:
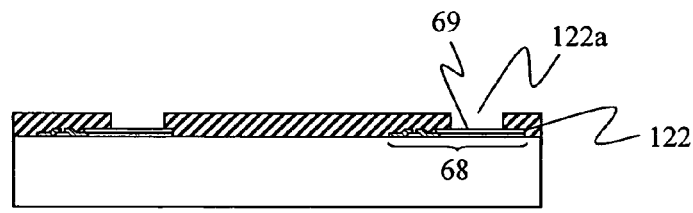

Next, as shown in FIG. 16B, the photoresist film 122 is exposed to a radiation through a photomask 124 and then developed. As a result, a number of openings 122a are made through the photoresist film 122 as shown in FIG. 16C. These openings 122a are arranged so as to expose the respective surfaces of the drain electrodes 69 of their associated switching elements 68 on the substrate 67.

Figure 16D:
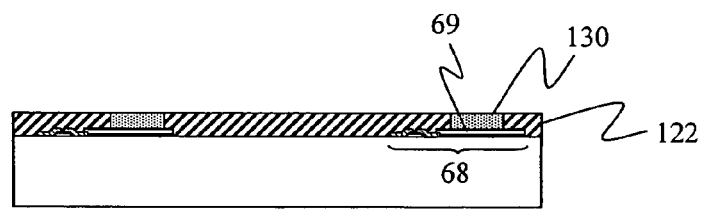
Figure 16E:
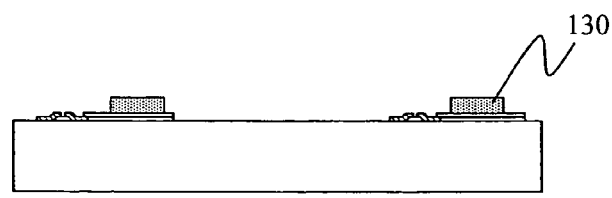

Subsequently, as shown in FIG. 16D, a metal such as Ni is electrodeposited in the openings 122a of the photoresist film 122 by a plating process, for example, thereby obtaining conductive members 130 that are electrically connected to the drain electrodes 69. Thereafter, the photoresist film 122 is stripped as shown in FIG. 16E.

After the conductive members 130 have been formed in this manner, the display device shown in FIGS. 14A and 14B can be fabricated by the same method as that described with reference to FIGS. 15D through 15I.

In this example, the conductive members 130 are formed by a plating process. However, it is not always necessary to adopt a plating process and the metallic material of the conductive members 130 is not limited to the material described above, either.

Embodiment 3

Hereinafter, a third preferred embodiment of a reflective display device according to the present invention will be described. Unlike the reflective display device of the second preferred embodiment shown in FIGS. 14A and 14B, the reflective display device of this third preferred embodiment further includes a flattening layer to flatten the uneven surface of the reflective layer and upper-level electrodes functioning as pixel electrodes on the flattening layer.

Figure 17:
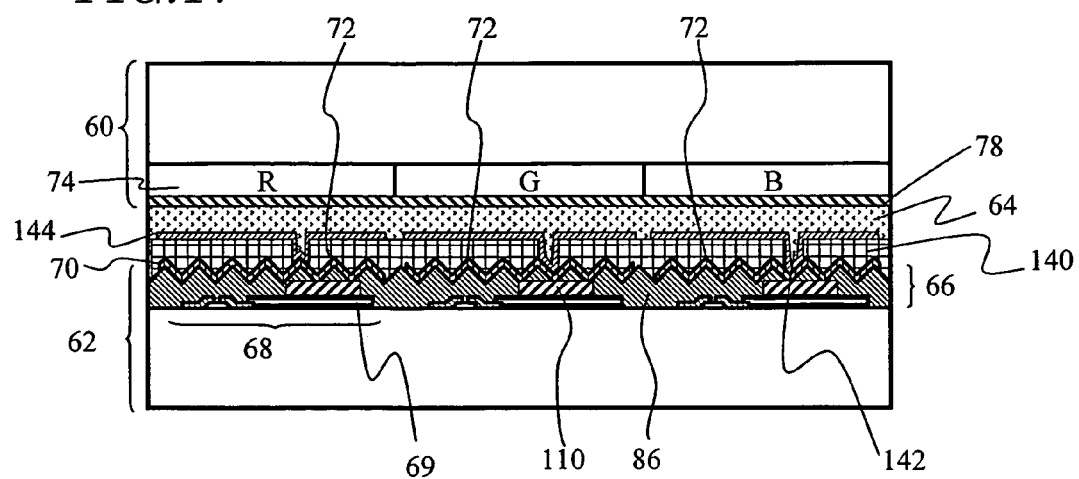
FIG. 17 is a schematic cross-sectional view illustrating a reflective display device according to a third preferred embodiment of the present invention.

FIG. 17 is a schematic cross-sectional view illustrating a reflective display device according to this preferred embodiment. If any of these components of the reflective display device has the same function as the counterpart shown in FIGS. 14A and 14B, that pair of components will be identified by the same reference numeral and the description thereof will be omitted herein for the sake of simplicity.

On the rear substrate 62 of the reflective display device of this preferred embodiment, stacked in this order are a corner cube array 66, a reflective layer 70, a flattening layer 140 to flatten the unevenness of the reflective layer 70, and a plurality of upper-level pixel electrodes 144. The corner cube array 66 and the reflective layer 70 have the same configuration, and are made of the same materials, as those already described with reference to FIGS. 14A and 14B. The flattening layer 140 may be made of an insulating resin material, for example. A number of contact holes 142 have been cut through the flattening layer 140 so as to reach the surface of the reflective layer 70. The upper-level pixel electrodes (made of ITO, for example) 144 are arranged on the flattening layer 140 and are electrically connected to their associated pixel electrodes 72 in the reflective layer 70 through the contact holes 142 of the flattening layer 140. Thus, in this preferred embodiment, the upper-level pixel electrode 144 and pixel electrode (i.e., lower-level pixel electrode) 72 of each pixel are electrically connected to the drain electrode 69 of its associated switching element 68 and function as a single pixel electrode.

According to this preferred embodiment, the flattening layer 140 is interposed between the reflective layer 70 and the liquid crystal layer 64, thus reducing the effects of the surface unevenness of the reflective layer 70 on the liquid crystal layer 64.

The conductive members 110 of this preferred embodiment are made of a material with electrical conductivity such as an electrically conductive resin or a metallic material as already described with reference to FIGS. 14A and 14B. However, at least a portion of each conductive member 110 needs to have electrical conductivity and function as a contact portion. For example, as already described with reference to FIGS. 9A and 9B, the conductive member 110 may have a structure in which a resin layer of an insulating material is coated with a conductive layer.

Hereinafter, a method for fabricating the reflective display device shown in FIG. 17 will be described with reference to FIGS. 18A through 18F.

Figure 18A:
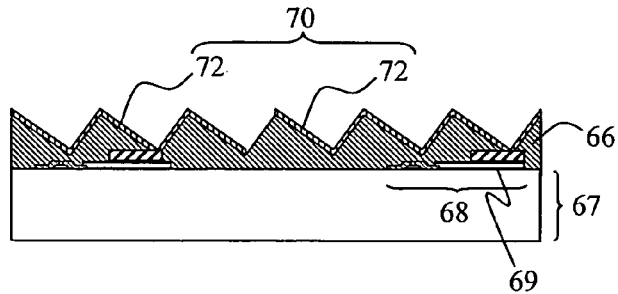
FIGS. 18A through 18F are cross-sectional views illustrating respective process steps for fabricating the reflective display device of the third preferred embodiment.

First, as shown in FIG. 18A, a corner cube array 66 and a reflective layer 70 are formed over a TFT substrate 67. The reflective layer 70 includes a plurality of pixel electrodes 72 that are separately arranged for respective pixels. Such a corner cube array 66 and reflective layer 70 may be made of the same materials, and formed by the same techniques, as those already described with reference to FIGS. 15A through 15I.

Figure 18B:
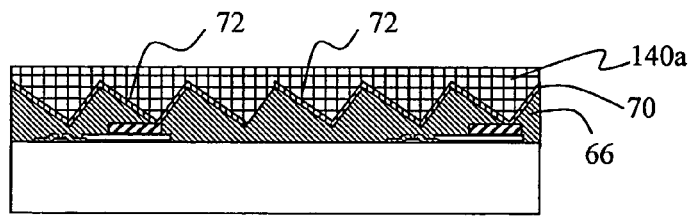

Next, as shown in FIG. 18B, a photosensitive resin film 140a is formed on the reflective layer 70. The photosensitive resin film 140a may be formed by applying a resin with photosensitivity (i.e., a photosensitive resin) onto the reflective layer 70. In this example, a negative acrylic photosensitive resin CR-700 (produced by Hitachi Chemical Co., Ltd.) is used as the photosensitive resin.

Figure 18C:
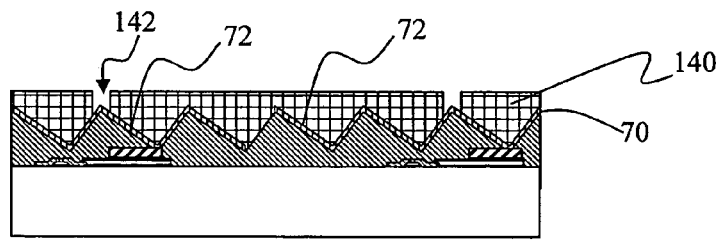

Thereafter, the photosensitive resin film 140a is exposed to radiation through a photomask (not shown), developed, and then cured finally, thereby forming a flattening layer 140 with contact holes 142 as shown in FIG. 18C. Each of these contact holes 142 is arranged so as to expose the surface of its associated pixel electrode 72.

Figure 18D:
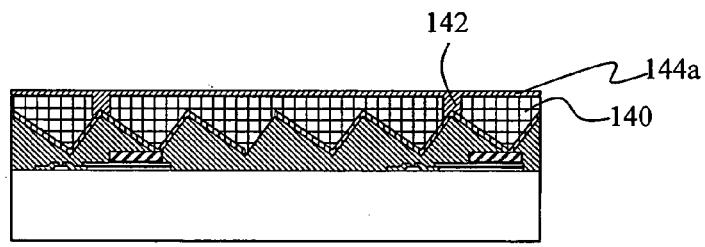
Figure 18E:
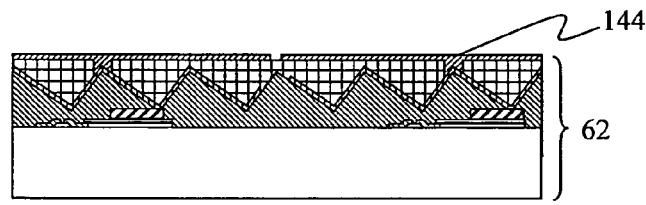

Subsequently, as shown in FIG. 18D, a transparent conductive film (of ITO, for example) 144a is deposited by a sputtering process, for example, so as to cover the surface of the flattening layer 140 and the inner surface of the contact holes 142. Then, this transparent conductive film 144a is patterned, thereby forming upper-level pixel electrodes 144 that are separated for respective pixels as shown in FIG. 18E. In this manner, a rear substrate 62 is obtained.

Figure 18F:
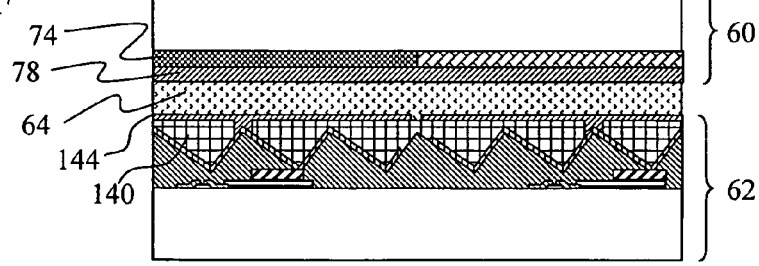

After that, by the same techniques as those already described with reference to FIG. 11K, the rear substrate 62 obtained as described above is bonded to a front substrate 60 including color filters 74 and a transparent counter electrode 78 thereon, and then a liquid crystal layer 64 is formed between the two substrates 60 and 62. As a result, a reflective liquid crystal display device such as that shown in FIG. 18F is completed.

In this process, the photosensitive resin film 140a is preferably made of a negative photosensitive resin. The reason will be described below with reference to FIG. 19.

Portions (a) and (b) of FIG. 19 are respectively a plan view and a cross-sectional view illustrating an exposure process step to be performed on the negative photosensitive resin film 140a and portion (c) of FIG. 19 is a cross-sectional view illustrating a development process step to be carried out on the negative photosensitive resin film 140a. Portions (b) and (c) of FIG. 19 are viewed on the plane IXX-IXX shown in portion (a) of FIG. 19.

When the photosensitive resin film 140a is exposed to radiation, a photomask 146, including an opaque region 146s and a light transmitting region 146t, is used as shown in portions (a) and (b) of FIG. 19. In this case, an incoming light ray 150 that has been transmitted through the transmitting region 146t of the photomask 146 and has entered the photosensitive resin film 140a is further transmitted through the photosensitive resin film 140a and then reflected by the reflective layer 70. Since the reflective layer 70 has a corner cube array shape, the light ray 150 is reflected toward the lowest-level portion of a corner cube on the reflective layer 70. A portion of this reflected light ray (which will be referred to herein as a "stray light ray 152") goes toward the lowest-level point of a portion of the photosensitive resin film 140a that is shielded with the opaque region 146s of the photomask 146.

When the photosensitive resin film 140a is developed after having been exposed, the non-exposed portion of the photosensitive resin film 140a is removed to form the flattening layer 140 as shown in portion (c) of FIG. 19. In this case, the portion of the photosensitive resin film 140a that has been shielded with the photomask 146 is not removed completely but is left partially in the region 148 that has been exposed to the stray light ray.

Thus, when a negative photosensitive resin is used, a contact hole 142 is formed in a different shape from that defined by the photomask 146 due to the effects of the stray light ray 152. More specifically, the contact hole 142 is formed around one of the highest-level points of the corner cube array shape of the reflective layer 70. Thus, the depth of the contact hole 142 (i.e., the maximum depth from the uppermost surface of the flattening layer 140 to the reflective layer 70) can be reduced. Also, the cross-sectional shape of the contact hole 142 is defined by the planes forming a corner cube and by the surfaces of the portion 148 that has been exposed to the stray light ray, and typically has a gently tapered shape with a relatively large taper angle. Consequently, when the transparent conductive film 144a is deposited by a sputtering process, for example, on the flattening layer 140, the transparent conductive film 144a and the reflective layer 70 can be connected together more securely.

According to the present invention, a retroreflective display device using a corner cube array can have increased retroreflectivity and improved display performance. In addition, such a reflective display device can be fabricated by a simpler method, too.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Application No. 2005-216454 filed in Japan on Jul. 26, 2005, the entire contents of which are hereby incorporated by reference.

What is claimed is:

1. A reflective display device comprising:
a light modulating layer;
two substrates, between which the light modulating layer is interposed; and
an electrode structure that changes the optical properties of the light modulating layer on a pixel-by-pixel basis,
wherein one of the two substrates includes a corner cube array in which a plurality of corner cubes are arranged, and
wherein the corner cube array includes a principal surface that defines a retroreflective surface, a bottom and a plurality of conductive members that are arranged between the principal surface and the bottom, and
wherein a portion of the upper surface of each said conductive member defines a part of the principal surface of the corner cube array, the part being located in a lowest-level portion of its associated corner cube including the lowest-level point thereof, and wherein the conductive member is in electrical communication with a drain electrode of a TFT and with the principal surface which comprises a reflective layer, and wherein another portion of the conductive member which is spaced apart from the lowest-level portion of the associated corner cube is covered by an insulating film that is provided between the conductive member and the principal surface of the corner cube array.

2. The reflective display device of claim 1, wherein the upper surface of each said conductive member is opposed to multiple lowest-level points of its associated corner cubes.

3. The reflective display device of claim 1, wherein the portion of the upper surface of each said conductive member forms a part of the principal surface of the corner cube array, wherein when measured from a plane including multiple lowest-level points of the corner cube array, the height of the portion of the upper surface of the conductive member is less than a half of the height of the highest-level points of the corner cube array.

4. The reflective display device of claim 1, wherein the one substrate includes a plurality of switching elements on the bottom of the corner cube array, each said conductive member being electrically connected to an associated one of the switching elements.

5. The reflective display device of claim 1, wherein the conductive members include a conductive resin.

6. The reflective display device of claim 1, wherein the conductive members include anisotropic conductive particles.

7. The reflective display device of claim 1, wherein the conductive members include a resin layer and a conductive film that covers the resin layer.

8. The reflective display device of claim 1, wherein each said corner cube in the corner cube array is defined by three substantially square planes that are opposed perpendicularly to each other.

9. The reflective display device of claim 1, wherein each said corner cube in the corner cube array is defined by three substantially rectangular triangular planes that are opposed perpendicularly to each other.

10. The reflective display device of claim 1, further comprising pixel electrodes, of which the shape corresponds with the surface shape of the corner cube array, between the corner cube array and the light modulating layer.

11. The reflective display device of claim 1, further comprising a flattening layer for flattening the surface shape of the corner cube array between the corner cube array and the light modulating layer.

12. A method for fabricating a reflective display device, which includes a light modulating layer, two substrates, between which the light modulating layer is interposed, and an electrode structure that changes the optical properties of the light modulating layer on a pixel-by-pixel basis, the method comprising the steps of:

providing a substrate including a plurality of switching elements thereon;

forming a layer to be patterned, including a plurality of conductive members, each being electrically connected to an associated one of the switching elements, and an insulating layer covering the conductive members, over the substrate;

making a master with an uneven surface shape defining a corner cube array shape; and transferring the uneven surface shape of the master onto the layer to be patterned, thereby exposing only partially the upper surface of each of the plurality of conductive members.

* * * * *